US009056697B2

(12) United States Patent
Smith

(10) Patent No.: US 9,056,697 B2
(45) Date of Patent: Jun. 16, 2015

(54) MULTI-LAYERED BAGS AND METHODS OF MANUFACTURING THE SAME

(75) Inventor: Allyson Smith, Columbia, SC (US)

(73) Assignee: Exopack, LLC, Spartanburg, SC (US)

( * ) Notice: Subject to any disclaimer, the term of this patent is extended or adjusted under 35 U.S.C. 154(b) by 580 days.

(21) Appl. No.: 12/335,414

(22) Filed: Dec. 15, 2008

(65) Prior Publication Data

US 2010/0150479 A1    Jun. 17, 2010

(51) Int. Cl.
   *B65D 30/08*   (2006.01)
   *B31B 37/00*   (2006.01)
   *B32B 27/12*   (2006.01)
   *B32B 27/32*   (2006.01)
   *B32B 27/34*   (2006.01)
   *B65D 33/18*   (2006.01)
   *B65D 33/25*   (2006.01)
   *B65D 33/26*   (2006.01)

(52) U.S. Cl.
   CPC ............. *B65D 31/02* (2013.01); *B31B 37/00* (2013.01); *B31B 2237/05* (2013.01); *B32B 27/12* (2013.01); *B32B 27/32* (2013.01); *B32B 27/34* (2013.01); *B65D 33/18* (2013.01); *B65D 33/2591* (2013.01); *B65D 33/26* (2013.01)

(58) Field of Classification Search
   USPC .......... 383/61.3, 109, 113, 116; 493/186, 267, 493/339, 927
   See application file for complete search history.

(56) References Cited

U.S. PATENT DOCUMENTS

| | | | |
|---|---|---|---|
| 2,536,834 A * | 1/1951 | Baker et al. | 383/84 |
| 2,870,954 A | 1/1959 | Kulesza | |
| 2,917,458 A * | 12/1959 | Lippincott et al. | 508/534 |
| 2,997,224 A | 8/1961 | Stannard | |
| 3,567,111 A | 3/1971 | Baxter | |
| 3,570,748 A | 3/1971 | Coyle et al. | |
| 3,628,720 A | 12/1971 | Schmedding | |
| 3,687,356 A | 8/1972 | Goodrich et al. | |
| 3,707,822 A * | 1/1973 | van der Meer | 53/331.5 |
| 3,784,085 A | 1/1974 | Kilgore | |
| 3,900,670 A | 8/1975 | Ikeda et al. | |
| 3,910,488 A | 10/1975 | Goodrich | |
| 3,924,013 A | 12/1975 | Kane | |
| 3,927,825 A | 12/1975 | Stearley | |
| 3,939,025 A | 2/1976 | Kane | |
| 3,966,115 A | 6/1976 | Hollis | |
| 3,967,998 A | 7/1976 | Kane | |
| 4,008,850 A | 2/1977 | Goodrich | |
| 4,088,264 A | 5/1978 | Vogt | |

(Continued)

FOREIGN PATENT DOCUMENTS

| | | |
|---|---|---|
| AU | 2006285224 | 5/2012 |
| CA | 2612334 | 6/2012 |

(Continued)

OTHER PUBLICATIONS

Notice of Publication dated Dec. 31, 2009 for U.S. Appl. No. 12/556,151.

(Continued)

*Primary Examiner* — Gloria R Weeks

(74) *Attorney, Agent, or Firm* — Stoel Rives LLP

(57) ABSTRACT

A bag can include walls formed of a material having multiple layers, one of which can be a layer of nonwoven material. A polyolefin layer can be joined to an outer face of the nonwoven layer. One or more films can be joined to an inner face of the nonwoven layer.

32 Claims, 28 Drawing Sheets

(56) References Cited

U.S. PATENT DOCUMENTS

| | | | |
|---|---|---|---|
| 4,096,309 A | 6/1978 | Stillman | |
| 4,147,291 A | 4/1979 | Akao et al. | |
| 4,387,126 A | 6/1983 | Rebholz | |
| 4,493,127 A | 1/1985 | Blanke, Jr. et al. | |
| 4,515,273 A | 5/1985 | Jacobson et al. | |
| 4,521,910 A | 6/1985 | Keppel et al. | |
| 4,700,531 A * | 10/1987 | Hsu et al. | 53/412 |
| 4,705,707 A | 11/1987 | Winter | |
| 4,716,061 A | 12/1987 | Winter | |
| 4,723,700 A * | 2/1988 | Wischusen, III | 229/117.33 |
| 4,743,123 A | 5/1988 | Legters et al. | |
| 4,753,832 A | 6/1988 | Brown et al. | |
| 4,778,058 A * | 10/1988 | Yamazaki et al. | 383/200 |
| 4,797,010 A | 1/1989 | Coelho | |
| 4,806,398 A | 2/1989 | Martin | |
| 4,808,421 A | 2/1989 | Mendenhall et al. | |
| 4,894,264 A | 1/1990 | Akao et al. | |
| 4,904,093 A | 2/1990 | Woods et al. | |
| 4,930,906 A | 6/1990 | Hemphill | |
| 4,946,289 A | 8/1990 | Bolling et al. | |
| 4,949,529 A | 8/1990 | Davis | |
| 4,952,441 A | 8/1990 | Bose et al. | |
| 4,961,944 A * | 10/1990 | Matoba et al. | 426/107 |
| 4,971,454 A | 11/1990 | Branson et al. | |
| 4,994,324 A | 2/1991 | Bose et al. | |
| 5,007,233 A | 4/1991 | Bose | |
| 5,038,009 A | 8/1991 | Babbitt | |
| 5,051,284 A | 9/1991 | Johansson et al. | |
| 5,073,421 A | 12/1991 | Akao | |
| 5,091,228 A | 2/1992 | Fujii et al. | |
| 5,097,956 A | 3/1992 | Davis | |
| 5,108,807 A * | 4/1992 | Tucker | 428/35.2 |
| 5,150,787 A | 9/1992 | Bird et al. | |
| 5,171,594 A | 12/1992 | Babbitt | |
| 5,225,256 A | 7/1993 | Marano et al. | |
| 5,244,702 A | 9/1993 | Finestone et al. | |
| 5,273,361 A | 12/1993 | Jillson | |
| 5,281,027 A | 1/1994 | Thrall | |
| 5,302,427 A | 4/1994 | Murschall et al. | |
| 5,310,587 A | 5/1994 | Akahori et al. | |
| 5,330,845 A | 7/1994 | Andersson et al. | |
| 5,332,586 A | 7/1994 | Di Mino | |
| 5,342,662 A | 8/1994 | Aoyama et al. | |
| 5,345,399 A | 9/1994 | Collins | |
| 5,376,392 A | 12/1994 | Ikegami et al. | |
| 5,399,022 A | 3/1995 | Sheets | |
| 5,405,663 A | 4/1995 | Archibald et al. | |
| 5,415,910 A | 5/1995 | Knauf | |
| 5,470,594 A | 11/1995 | Di Mino | |
| 5,482,376 A | 1/1996 | Mosely et al. | |
| 5,488,220 A | 1/1996 | Freeks et al. | |
| 5,499,403 A * | 3/1996 | Harrigan | 2/247 |
| 5,512,338 A | 4/1996 | Bianchini et al. | |
| 5,520,464 A | 5/1996 | Kristola | |
| 5,520,970 A | 5/1996 | Christensson et al. | |
| 5,529,396 A | 6/1996 | Pryor et al. | |
| 5,536,542 A | 7/1996 | Gillespie et al. | |
| 5,553,942 A | 9/1996 | Domke et al. | |
| 5,558,438 A | 9/1996 | Warr | |
| 5,560,296 A | 10/1996 | Adams | |
| 5,560,945 A | 10/1996 | Geddes et al. | |
| 5,585,129 A * | 12/1996 | Geddes et al. | 426/394 |
| 5,593,229 A | 1/1997 | Warr | |
| 5,601,369 A | 2/1997 | Mosely et al. | |
| 5,604,042 A | 2/1997 | Bianchini et al. | |
| 5,611,626 A | 3/1997 | Warr | |
| 5,659,933 A | 8/1997 | McWilliams | |
| 5,679,278 A * | 10/1997 | Cox | 219/730 |
| 5,728,037 A | 3/1998 | Pryor et al. | |
| 5,770,839 A | 6/1998 | Ruebush et al. | |
| 5,814,382 A | 9/1998 | Yannuzzi, Jr. | |
| 5,823,933 A * | 10/1998 | Yeager | 493/213 |
| 5,830,548 A * | 11/1998 | Andersen et al. | 428/36.4 |
| 5,851,608 A | 12/1998 | Yamada et al. | |
| 5,871,790 A | 2/1999 | Monier et al. | |
| 5,876,815 A | 3/1999 | Sandstrom et al. | |
| RE36,177 E | 4/1999 | Rouyer et al. | |
| 5,902,046 A | 5/1999 | Shibata | |
| 5,912,070 A | 6/1999 | Miharu et al. | |
| 5,985,772 A * | 11/1999 | Wood et al. | 442/70 |
| 6,003,670 A | 12/1999 | Beer | |
| 6,019,713 A | 2/2000 | Scypinski et al. | |
| 6,046,443 A | 4/2000 | Ackerman et al. | |
| 6,065,871 A | 5/2000 | Warr | |
| 6,071,576 A | 6/2000 | Bentmar et al. | |
| 6,100,513 A * | 8/2000 | Jackson et al. | 219/727 |
| 6,137,098 A | 10/2000 | Moseley et al. | |
| 6,187,396 B1 | 2/2001 | Möller | |
| 6,193,831 B1 * | 2/2001 | Overcash et al. | 156/230 |
| 6,213,644 B1 | 4/2001 | Henderson et al. | |
| 6,231,232 B1 | 5/2001 | Warr | |
| 6,248,442 B1 | 6/2001 | Kong et al. | |
| 6,251,489 B1 * | 6/2001 | Weiss et al. | 428/35.2 |
| 6,277,547 B1 * | 8/2001 | Bourdelais et al. | 430/432 |
| 6,299,351 B1 | 10/2001 | Warr | |
| 6,333,061 B1 | 12/2001 | Vadhar | |
| 6,333,086 B1 | 12/2001 | Ora et al. | |
| 6,346,332 B1 | 2/2002 | Bryden et al. | |
| 6,367,976 B1 | 4/2002 | Bannister | |
| 6,372,317 B1 | 4/2002 | Denney et al. | |
| 6,374,461 B1 | 4/2002 | Gober et al. | |
| 6,375,981 B1 | 4/2002 | Gilleland et al. | |
| 6,402,379 B1 | 6/2002 | Albright | |
| 6,436,547 B1 | 8/2002 | Toft et al. | |
| 6,479,137 B1 | 11/2002 | Joyner | |
| 6,500,505 B2 | 12/2002 | Piper et al. | |
| 6,509,105 B2 | 1/2003 | Olvey | |
| 6,528,088 B1 | 3/2003 | Gilleland et al. | |
| 6,534,137 B1 | 3/2003 | Vadhar | |
| 6,544,629 B1 * | 4/2003 | Bailey | 428/192 |
| 6,565,936 B1 | 5/2003 | Peiffer et al. | |
| 6,576,304 B2 | 6/2003 | Yamada et al. | |
| 6,579,580 B1 | 6/2003 | Yamada et al. | |
| 6,589,384 B2 | 7/2003 | Chen et al. | |
| 6,609,999 B2 | 8/2003 | Albright | |
| 6,623,162 B2 | 9/2003 | Pang | |
| 6,652,984 B2 | 11/2003 | Finestone et al. | |
| 6,673,465 B2 | 1/2004 | Lordi | |
| 6,715,919 B2 | 4/2004 | Hiraiwa et al. | |
| 6,746,736 B2 | 6/2004 | Leeper et al. | |
| 6,767,600 B1 | 7/2004 | Kasahara | |
| 6,797,395 B2 | 9/2004 | Finestone et al. | |
| 6,855,387 B2 | 2/2005 | Yamada et al. | |
| 6,858,313 B2 | 2/2005 | Musco et al. | |
| 6,883,964 B2 | 4/2005 | Beaulieu | |
| 6,887,538 B2 | 5/2005 | Denney et al. | |
| 6,893,686 B2 | 5/2005 | Egan | |
| 6,899,460 B2 * | 5/2005 | Turvey et al. | 383/33 |
| 6,919,111 B2 | 7/2005 | Swoboda et al. | |
| 6,921,563 B2 | 7/2005 | Goerlitz et al. | |
| 6,926,951 B2 | 8/2005 | Huffer et al. | |
| 6,926,968 B2 | 8/2005 | Lordi | |
| 6,964,797 B2 | 11/2005 | Salste et al. | |
| 6,974,612 B1 | 12/2005 | Frisk et al. | |
| 7,090,904 B2 | 8/2006 | Hartzell et al. | |
| 7,135,234 B2 * | 11/2006 | Donnelly et al. | 428/519 |
| 7,147,913 B2 | 12/2006 | Iwasaki et al. | |
| 7,157,126 B2 | 1/2007 | Cosentino et al. | |
| 7,364,361 B2 * | 4/2008 | Turvey et al. | 383/33 |
| 7,459,214 B2 | 12/2008 | Olofsson et al. | |
| 7,476,441 B2 | 1/2009 | Iwasaki et al. | |
| 7,747,441 B2 * | 6/2010 | Yamaura | 704/264 |
| 7,954,306 B2 * | 6/2011 | Gould | 53/452 |
| 8,142,078 B2 * | 3/2012 | Matsunaga | 383/210 |
| 8,210,746 B2 * | 7/2012 | Kerr et al. | 383/67 |
| 8,282,539 B2 | 10/2012 | Sharp et al. | |
| 2001/0046593 A1 | 11/2001 | Leavy et al. | |
| 2003/0044552 A1 | 3/2003 | Komada | |
| 2003/0077007 A1 * | 4/2003 | Turvey et al. | 383/33 |
| 2003/0229168 A1 | 12/2003 | Borsinger et al. | |
| 2004/0038792 A1 | 2/2004 | Albright | |
| 2004/0052987 A1 | 3/2004 | Shetty et al. | |
| 2004/0069157 A1 * | 4/2004 | Lin | 99/451 |
| 2004/0091648 A1 | 5/2004 | Hartzell et al. | |

(56) References Cited

U.S. PATENT DOCUMENTS

| | | | |
|---|---|---|---|
| 2004/0105600 A1 | 6/2004 | Floyd, Jr. | |
| 2004/0105942 A1 | 6/2004 | Cable | |
| 2004/0136616 A1 | 7/2004 | Allen et al. | |
| 2004/0137206 A1 | 7/2004 | Pettis | |
| 2004/0175060 A1 | 9/2004 | Woodham et al. | |
| 2004/0191438 A1 | 9/2004 | Cosentino et al. | |
| 2004/0217112 A1 | 11/2004 | Monforton et al. | |
| 2004/0228547 A1 | 11/2004 | Hartzell et al. | |
| 2005/0008736 A1 | 1/2005 | Egan et al. | |
| 2005/0084185 A1 | 4/2005 | Moon | |
| 2005/0100252 A1 | 5/2005 | Rivlin et al. | |
| 2005/0112305 A1 | 5/2005 | Swoboda et al. | |
| 2005/0191399 A1 | 9/2005 | Jackson et al. | |
| 2005/0230384 A1 | 10/2005 | Robinson et al. | |
| 2006/0073292 A1 | 4/2006 | Hartzell et al. | |
| 2006/0231552 A1* | 10/2006 | Caya | 219/727 |
| 2007/0042146 A1 | 2/2007 | Sharp | |
| 2007/0047852 A1 | 3/2007 | Sharp et al. | |
| 2007/0047853 A1* | 3/2007 | Sharp et al. | 383/106 |
| 2007/0104905 A1* | 5/2007 | Floyd, Jr. | 428/36.1 |
| 2007/0110932 A1 | 5/2007 | Castillo et al. | |
| 2007/0238379 A1 | 10/2007 | Bhatnagar et al. | |
| 2008/0044546 A1 | 2/2008 | Jensen et al. | |
| 2008/0070047 A1 | 3/2008 | Rehkugler et al. | |
| 2008/0078759 A1 | 4/2008 | Wnek et al. | |
| 2008/0166457 A1 | 7/2008 | Gorman et al. | |
| 2008/0268106 A1 | 10/2008 | Jackson et al. | |
| 2009/0257687 A1* | 10/2009 | Mitchell | 383/103 |
| 2009/0324143 A1 | 12/2009 | Sharp et al. | |
| 2010/0150479 A1 | 6/2010 | Smith | |
| 2010/0158417 A1 | 6/2010 | Sharp et al. | |
| 2011/0097022 A1* | 4/2011 | Moehlenbrock | 383/109 |
| 2011/0103720 A1* | 5/2011 | De Muinck | 383/109 |
| 2011/0150368 A1* | 6/2011 | Ellsworth et al. | 383/6 |
| 2011/0176753 A1* | 7/2011 | Nowak et al. | 383/116 |
| 2012/0063704 A1* | 3/2012 | Hoying et al. | 383/75 |
| 2012/0195531 A1* | 8/2012 | Moehlenbrock et al. | 383/109 |

FOREIGN PATENT DOCUMENTS

| | | |
|---|---|---|
| DE | 0148436 | 5/1981 |
| EP | 0 822 063 | 2/1998 |
| EP | 0822063 | 4/1998 |
| FR | 2256660 | 7/1975 |
| FR | 2847232 | 5/2004 |
| GB | 1462941 | 1/1977 |
| GB | 2351039 | 12/2000 |
| JP | 11-084597 | 3/1999 |
| JP | 2004-345327 | 12/2004 |
| JP | 2006-231723 | 9/2006 |
| NL | 6806715 | 7/1968 |
| WO | WO 00/53429 | 9/2000 |
| WO | WO 01/94451 | 12/2001 |
| WO | WO-2002/079304 | 10/2002 |
| WO | WO 03064167 | 8/2003 |
| WO | WO 2007/027423 | 3/2007 |
| WO | WO 2010/075018 | 7/2010 |
| WO | WO 2010/075146 | 7/2010 |
| WO | WO 2011/031353 | 3/2011 |

OTHER PUBLICATIONS

Office Action dated Jan. 5, 2010 for U.S. Appl. No. 11/240,944.
Office Action dated Jan. 5, 2010 for U.S. Appl. No. 11/214,419.
Office Action dated Jan. 5, 2010 for U.S. Appl. No. 11/214,434.
Notification of Transmittal of the International Search Report and the Written Opinion of the International Searching Authority mailed Dec. 17, 2010 in International Application No. PCT/US2010/036435.
Graphic Packaging International, Graphic Packaging Expands Microrite® Line with New Oil-Absorbent Sleeve for Beckers in Europe (Nov. 30, 2005), available at http://phx.corporate-ir.net/phoenix.zhtml?c=103159&p=irol-newsArticle&ID=791279&highlight=.
"While Bags Take a Beating from China, Bemis Offers a New Poly/Plastic Hybrid Solution," Packaging Strategies, vol. 26, No. 16, p. 4 (Sep. 15, 2008).
"Mulilayer Kraft Paper Bag for Food Products," DD-148-436, 1 page (May 1981). (DL-1981-05).
Notification of Transmittal of the International Search Report and the Written Opinion of the International Searching Authority issued Mar. 18, 2008 in International Application No. PCT/US06/031690.
Requirement for Restriction/Election dated Apr. 21, 2008 in co-pending U.S. Appl. No. 11/240,944.
Response to the Restriction/Election dated May 21, 2008 in co-pending U.S. Appl. No. 11/240,944.
Office Action dated Jul. 24, 2008 in co-pending U.S. Appl. No. 11/240,944.
Response to the Office Action dated Nov. 24, 2008 in co-pending U.S. Appl. No. 11/240,944.
Terminal Disclaimers and 3,73(b) Statement dated Nov. 24, 2008 in co-pending U.S. Appl. No. 11/240,944.
Office Action dated Feb. 6, 2009 in co-pending U.S. Appl. No. 11/240,944.
Examiner Interview Summary dated Mar. 12, 2009 in co-pending U.S. Appl. No. 11/240,944.
Request for Continued Examination submitted with a Response to the Office Action and a Rule 131 Declaration dated May 6, 2009 in co-pending U.S. Appl. No. 11/240,944.
Office Action dated Jul. 21, 2009 in co-pending U.S. Appl. No. 11/240,944.
Draft Claims for an In-Person Interview dated Oct. 5, 2009 in co-pending U.S. Appl. No. 11/240,944.
Response to the Office Action with an Appendix dated Oct. 21, 2009 in co-pending U.S. Appl. No. 11/240,944.
Examiner Interview Summary dated Oct. 22, 2009 in co-pending U.S. Appl. No. 11/240,944.
Requirement for Restriction/Election dated May 12, 2008 in co-pending U.S. Appl. No. 11/214,419.
Response to the Requirement for Restriction/Election dated Jun. 12, 2008 in co-pending U.S. Appl. No. 11/214,419.
Office Action dated Jul. 21, 2008 in co-pending U.S. Appl. No. 11/214,419.
Response to the Office Action dated Nov. 21, 2008 in co-pending U.S. Appl. No. 11/214,419.
Terminal Disclaimers and 3.73(b) Statement dated Nov. 21, 2008 in co-pending U.S. Appl. No. 11/214,419.
Office Action dated Feb. 10, 2009 in co-pending U.S. Appl. No. 11/214,419.
Examiner Interview Summary dated Mar. 12, 2009 in co-pending U.S. Appl. No. 11/214,419.
Request for Continued Examination submitted with a Response to the Office Action and a Rule 131 Declaration dated May 7, 2009 in co-pending U.S. Appl. No. 11/214,419.
Office Action dated Jul. 21, 2009 in co-pending U.S. Appl. No. 11/214,419.
Draft Claims for an In-Person Interview dated Oct. 5, 2009 in co-pending U.S. Appl. No. 11/214,419.
Response to the Office Action with an Appendix dated Oct. 21, 2009 in co-pending U.S. Appl. No. 11/214,419.
Examiner Interview Summary dated Oct. 21, 2009 in co-pending U.S. Appl. No. 11/214,419.
Office Action dated Jul. 22, 2008 in co-pending U.S. Appl. No. 11/214,434.
Response to the Office Action dated Nov. 24, 2008 in co-pending U.S. Appl. No. 11/214,434.
Terminal Disclaimers and 3.73(b) Statement dated Nov. 24, 2008 in co-pending U.S. Appl. No. 11/214,434.
Office Action dated Feb. 5, 2009 in co-pending U.S. Appl. No. 11/214,434.
Request for Continued Examination submitted with a Response to the Office Action and a Rule 131 Declaration dated May 4, 2009 in co-pending U.S. Appl. No. 11/214,434.
Office Action dated Jul. 23, 2009 in co-pending U.S. Appl. No. 11/214,434.
Draft Claims for an In-Person Interview dated Oct. 5, 2009 in co-pending U.S. Appl. No. 11/214,434.

(56) References Cited

OTHER PUBLICATIONS

Response to the Office Action with an Appendix dated Oct. 21, 2009 in co-pending U.S. Appl. No. 11/214,434.
Examiner Interview Summary dated Oct. 21, 2009 in co-pending U.S. Appl. No. 11/214,434.
Co-pending U.S. Appl. No. 12/341,080, titled Multi-Layer Bags and Methods of Manufacturing the Same, filed Dec. 22, 2008.
Co-pending U.S. Appl. No. 12/335,414, titled Multi-Layer Bags and Methods of Manufacturing the Same, filed Dec. 15, 2008.
European Search Report dated Oct. 23, 2009.
Bentley, David J., Jr., "About Cold Seal Adhesives", Paper Film and Foil Converter, 2 pgs., Jan. 2006.
Smith, Nancy, "Cold Seal Adhesives", Rhom & Haas Company, Aimcal Conference, 6 pgs., 2005.
Food Packaging Technology, ed. Coles, et al., CRC Press, 2003.
Notice of Abandonment mailed Aug. 17, 2010 in U.S. Appl. No. 11/240,944, now abandoned.
Notice of Abandonment mailed Aug. 17, 2010 in U.S. Appl. No. 11/214,419, now abandoned.
Notice of Abandonment mailed Aug. 17, 2010 in U.S. Appl. No. 11/214,434, now abandoned.
Office Action mailed Sep. 14, 2011 in co-pending U.S. Appl. No. 12/341,080, now published as US 2010/0158417.
Restriction Requirement mailed Dec. 21, 2011 in co-pending U.S. Appl. No. 12/556,151, now published as US 2010/0324143.
Amendment and Response to Office Action filed Mar. 14, 2012 in co-pending U.S. Appl. No. 12/341,080, now issued as U.S. Patent No. 8,282,539.
Applicant-Initiated Interview Summary mailed Mar. 23, 2012 in co-pending U.S. Appl. No. 12/341,080, now issued as U.S. Patent No. 8,282,539.
Notice of Allowance and Fee(s) Due mailed May 24, 2012 in co-pending U.S. Appl. No. 12/341,080, now issued as U.S. Patent No. 8,282,539.
Amendment After Notice of Allowance filed Aug. 24, 2012 in co-pending U.S. Appl. No. 12/341,080, now issued as U.S. Patent No. 8,282,539.
Response to Rule 312 Communication mailed Sep. 6, 2012 in co-pending U.S. Appl. No. 12/341,080, now issued as U.S. Patent No. 8,282,539.
Response to Restriction Requirement filed May 21, 2012 in co-pending U.S. Appl. No. 12/556,151, now published as US 2010/0324143.
Notice of Non-Compliant Amendment mailed May 23, 2012 in co-pending U.S. Appl. No. 12/556,151, now published as US 2010/0324143.
Response to Notice of Non-Compliant Amendment filed Jun. 1, 2012 in co-pending U.S. Appl. No. 12/556,151, now published as US 2010/0324143.
Office Action mailed Aug. 13, 2012 in co-pending U.S. Appl. No. 12/556,151, now published as US 2010/0324143.
Applicant-Initiated Interview Summary mailed Aug. 23, 2012 in co-pending U.S. Appl. No. 12/556,151, now published as US 2010/0324143.
Joseph F. Hanlon, et al, "Handbook of Package Engineering," 44, 45, 690-91 (3rd ed. 1998) (6 pgs).
Amendment and Response to Office Action filed Feb. 13, 2013 in co-pending U.S. Appl. No. 12/556,151, now published as US 2010/0324143.
Notification of Transmittal of the International Search Report and the Written Opinion of the International Searching Authority mailed Jul. 21, 2010 in International Application No. PCT/US2006/031690.
Notification of Transmittal of the International Search Report and the Written Opinion of the International Searching Authority mailed Aug. 17, 2010 in International Application No. PCT/US2000/068368.
Final Office Action mailed May 13, 2013 in co-pending U.S. Appl. No. 12/556,151, now published as US 2009/0324143.
Amendment and Response to Office Action and RCE filed Nov. 13, 2013 in co-pending U.S. Appl. No. 12/556,151, now published as US 2009/0324143.
Examination Report issued Feb. 11, 2014 in co-pending European patent application No. 06801452.1.

* cited by examiner

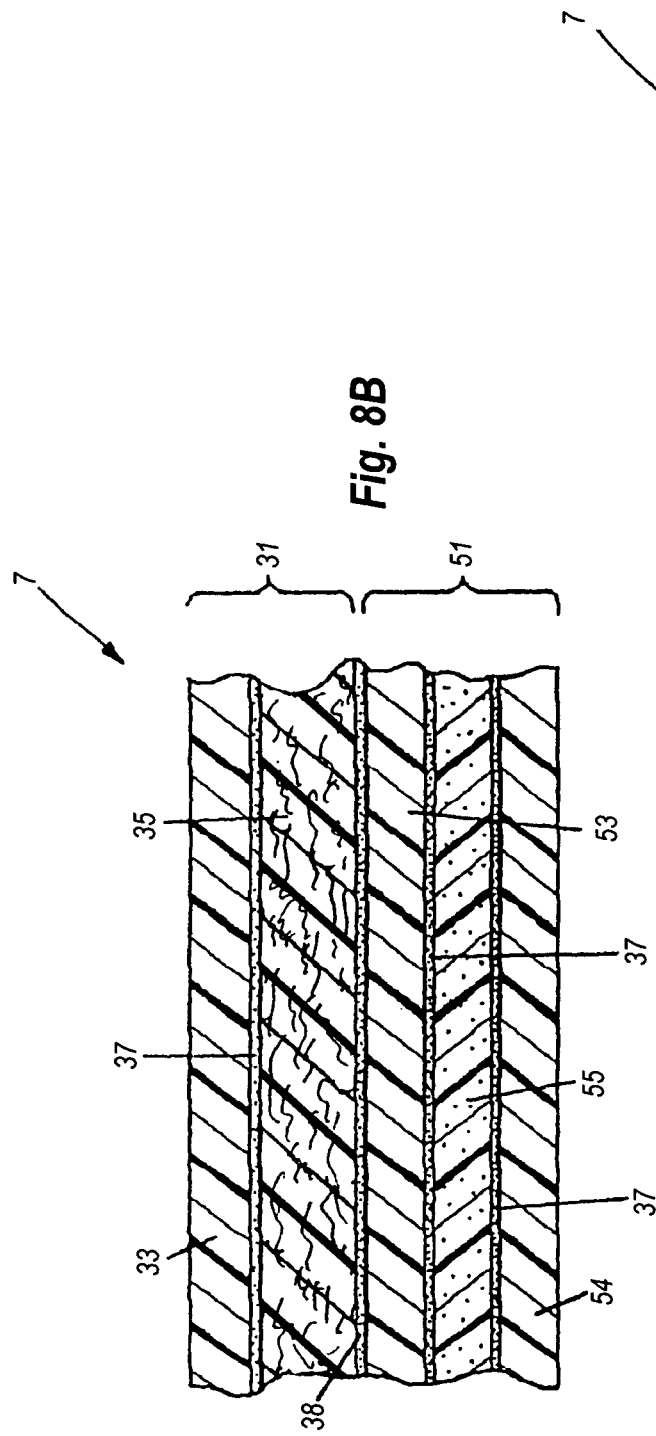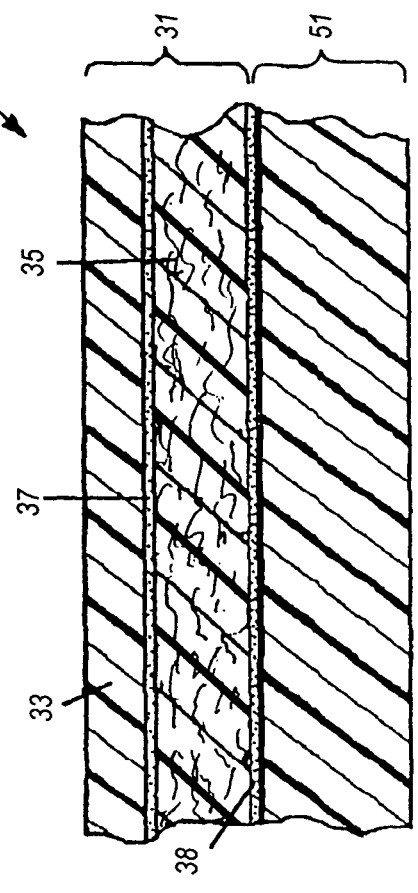

TABLE 2

| Nonwoven Material | Tensile (lbs/in) MD x CD | Elongation (%) MD x CD | Tear (g) MD x CD | Tear Initiation (g) MD x CD | Dull Puncture (g) |
|---|---|---|---|---|---|
| DuPont Tyvek® 42 gsm | 20 x 22 | 14 x 19 | 381 x 372 | 1636 x 1942 | 8064 |
| DuPont ACT 85 gsm | 24 x 12 | 82 x 88 | 1072 x 1734 | 379 x22786 | 5757 |
| Fiberweb Synergex 6120 | 21 x 12 | 54 x 70 | 1435 x 2250 | 2640 x 1903 | 6088 |
| Fiberweb Tycon 3121L | 6 x 3 | 14 x 7 | 999 x 938 | 581 x 512 | 2961 |
| Fiberweb Typar 6161L | 8 x 6 | 10 x 10 | 1344 x 1274 | 1117 x 1037 | 4967 |
| Fiberweb Reemay 6125 | 32 x 18 | 63 x 80 | 1457 x 2170 | 3265 x 2581 | 7741 |
| Fiberweb Typar 3091L | 5 x 3 | 16 x 15 | 401 x 381 | 515 x 274 | 177 |
| Polyart 92 gsm (pet food bag) | 31 x 34 | 100 x 118 | 58 x 57 | 2082 x 1931 | 8799 |
| Polyart 65 gsm | 22 x 24 | 122 x 124 | 38 x 36 | 804 x 817 | 6027 |
| Polyart 140 gsm | 33 x 27 | 110 x 58 | 67 x 75 | 811 x11460 | 6 |
| Ahlstrom 35260 | 20 X 10 | 46 X 56 | 735 X NA | 2998 X 2286 | 7906 |
| Ahlstrom 25604 | 17 X 9 | 23 X 19 | 1365 X NA | 2156 X 1636 | 6504 |
| Ahlstrom 25219 | 27 X 13 | 45 X 55 | 608 X NA | 3296 X 2635 | 8754 |
| Ahlstrom 1404 | 34 X 11 | 14 X 16 | 388 X NA | 2172 X 1591 | 6252 |
| Ahlstrom 5507 | 14 X 9 | 15 X 34 | 1400 X NA | 2098 X 1887 | 9641 |
| Ahlstrom 25724 | 23 X 9 | 88 X 99 | 852 X NA | 2797 X 1735 | 4012 |
| Ahlstrom 25206 51 gsm PP | 15 X 6 | 40 X 45 | 894 X NA | 2148 X 1370 | 5359 |
| Ahlstrom 25260 72 gsm PP | 20 X 10 | 43 X 48 | 478 X NA | 2818 X 2205 | 7149 |
| Ahlstrom 25607 50 gsm PET | 11 X 7 | 22 X 27 | 534 X NA | 1259 X 1129 | 3676 |
| Ahlstrom 25604 72 gsm PP | 17 X 9 | 23 X 23 | 1207 X NA | 2198 X 1583 | 6917 |
| Ahlstrom 25724 61 gsm PE/PET | 30 X 8 | 99 X 110 | 843 X NA | 2940 X 2011 | 5028 |

*Fig. 21*

TABLE 3

| | Material | Tensile (lbs/in) MD x CD | Elongation (%) MD x CD | Tear (g) MD x CD | Tear Initiation (g) MD x CD | Dull Puncture (g) |
|---|---|---|---|---|---|---|
| 1 | Average WPP | Exceeds | Exceeds | Did not tear | 5000 X 5000 | 20000 |
| 2 | Thermal laminate Fiberweb Reemay® spunbond polyester to 12 micron BOPET film | 16 X N/A | 33 X N/A | 425 X 726 | 1040 X N/A | 4835 |
| 3 | Thermal laminate Fiberweb® Typar PP spunbond to 18 micron PP film | 22 X 23 | 8 X 8 | 1515 X 1186 | 2134 X 2368 | 5182 |
| 4 | PET/DuPont ACT1/BOPP | 54 X 48 | 74 X 22 | 275 X 442 | 3447 X 2485 | 13759 |
| 5 | PET/DuPont ACT1/BOPP | 54 X 60 | 73 X 41 | 257 X 454 | 3661 X 2587 | 15333 |
| 6 | PET/EVA/DuPont ACT1/BOPP | 59 X 56 | 83 X 34 | 320 X 426 | 4190 X 2902 | 15866 |
| 7 | PET/AF1/DuPont ACT1/BOPP (adhesive film) | 56 X 61 | 74 X 38 | 394 X 475 | 3896 X 3067 | 16926 |
| 8 | PET/AF2/DuPont ACT1/BOPP (adhesive film) | 58 X 58 | 81 X 35 | 414 X 700 | 3479 X 3047 | 15505 |
| 9 | PET/AF2/DuPont ACT2/BOPP (adhesive film) | 93 X 92 | 38 X 32 | 351 X 506 | 4012 X 3838 | 28305 |
| 10 | PET/adh/DuPont ACT1 | 43 X 31 | 71 X 52 | 245 X 291 | 3005 X 2019 | 9663 |
| 11 | PET/adh/DuPont ACT2 | 82 X 60 | 31 X 28 | 318 X 450 | 3590 X 3564 | 23869 |
| 12 | 48ga PET/white poly/Ahlstrom 2.5 oz NW (PET/PE fibers) | 32 X 31 | 25 X 29 | 851 X 790 | 3318 X 3609 | 18759 |
| 13 | 48 ga PET/white poly/Ahlstrom 2.5 oz NW (PET fibers) | 34 X 20 | 66 X 51 | 841 X 1898 | 3706 X 2328 | 7880 |
| 14 | 48 ga PET/white poly/Ahlstrom 2.5 oz NW (PET/PE fibers)/white poly/2 mil LLDPE | 45 X 42 | 33 X 36 | 886 X 966 | 3889 X 4007 | 17805 |
| 15 | 48 ga PET/white poly/Ahlstrom 2.5 oz NW (PET fibers)/white poly/2 mil LLDPE | 43 X 25 | 70 X 54 | 957 X 1943 | 4200 X 3679 | 10761 |

*Fig. 22*

MULTI-LAYERED BAGS AND METHODS OF MANUFACTURING THE SAME

TECHNICAL FIELD

Embodiments disclosed herein relate generally to bags that can be used in the packaging industry, and more particularly to multi-layered bags and methods for manufacturing the same.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 8A illustrates a cross-sectional view of another embodiment of a body material compatible with the bag of FIG. 1;

FIG. 8B illustrates a cross-sectional view of the material of FIG. 7 taken along the view line 8B-8B in FIG. 5;

FIG. 21 illustrates a table that includes measurements of properties of various nonwoven materials that can be compatible with certain embodiments of a multi-layered bag; and FIG. 22 a table that includes measurements of properties of various layered materials that can be compatible with certain embodiments of a multi-layered bag.

DETAILED DESCRIPTION

Embodiments of a bag are disclosed. In many embodiments, the bag can comprise multiple layers. Each layer can provide the bag with one or more desirable characteristics, depending on the application of the bag. In certain embodiments, the bag can comprise a layer of nonwoven material, which can contribute to the stiffness and strength of the bag and can aid in manufacturing the bag using standard converting equipment. In some embodiments, the bag comprises one or more polyolefin layers. In some embodiments, the one or more polyolefin layers can provide the bag with grease-resistant properties, heat-sealing capabilities, and/or one or more aesthetic enhancements, such as printed indicia and/or a glossy finish. In many embodiments, the bag is flexible and can be suitable for use in large formats (e.g., for storage of large amounts of contents). Such embodiments, as well as others, are disclosed in greater detail below.

Figure 1:
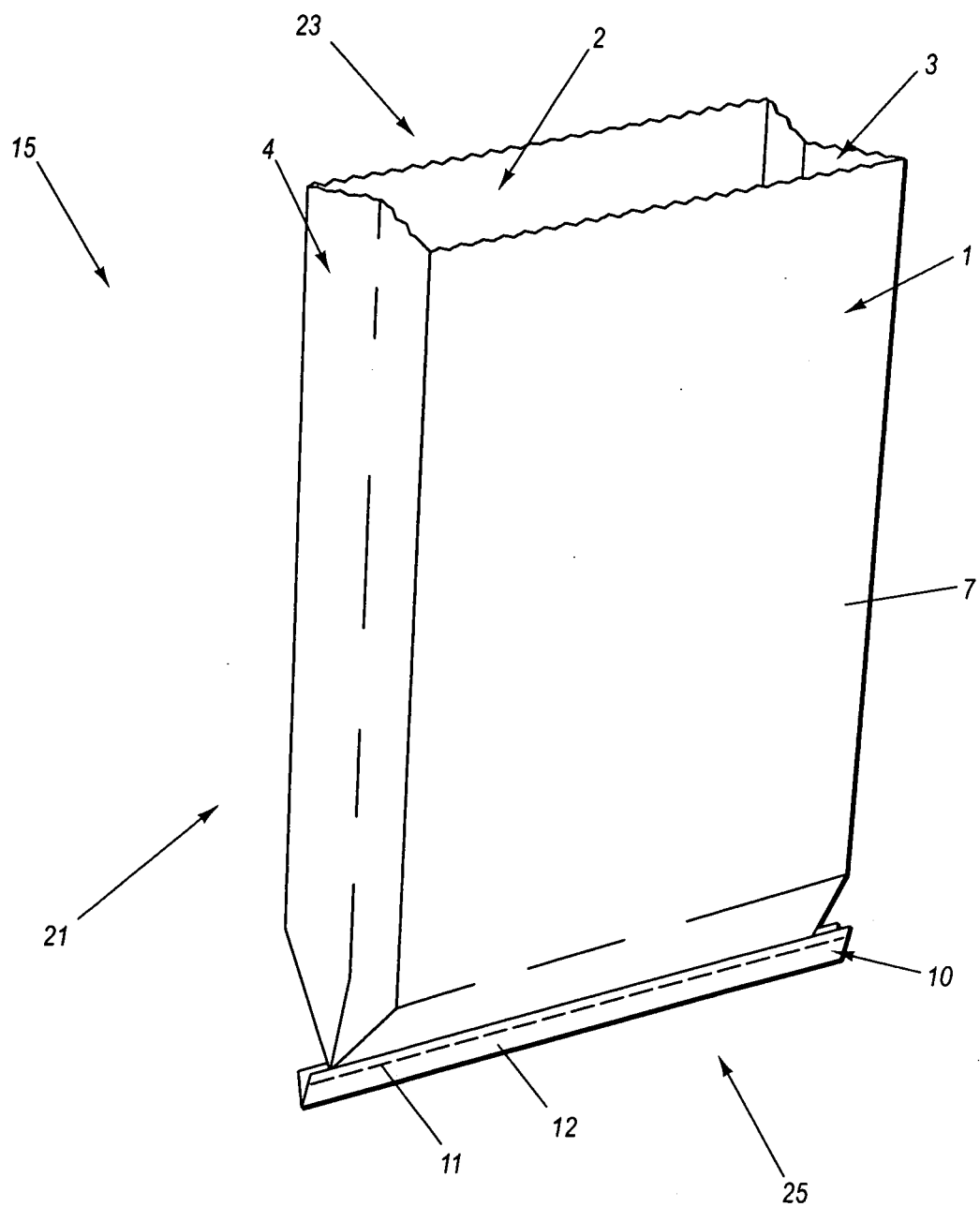
FIG. 1 illustrates a perspective view of an embodiment of a bag having a sewn end and an open end.

FIG. 1 illustrates a perspective view of an embodiment of a bag 15. The bag 15 can include a body portion 21, which can be substantially tubular in form. For example, in some embodiments, the body portion 21 defines a front wall 1, a back wall 2, a first side wall 3, and a second side wall 4. In certain embodiments, the bag 15 defines a sewn-open-mouth configuration, and can include a closure seam 10 at a bottom end 25 of the body portion 21. In some embodiments, the seam 10 comprises one or more stitching elements 11, such as threads, strings, or yarns, that extend through the front wall 1 and the back wall 2 in a sewn or stitching pattern. In some embodiments, the one or more stitching elements 11 can further extend through end portions of the first side wall 3 and/or the second side wall 4. In some embodiments, a closure strip 12, which can comprise paper or any other suitable material, is positioned over (e.g., at an outwardly facing surface of) the front wall 1 and the back wall 2 and is sewn to the front and back walls 1, 2 via the one or more stitching elements 11. When the bag 15 is in a sewn-open-mouth configuration, a top end 23 of the bag 15 can be open such that a product can be received into the bag 15, and the product can be maintained within the bag 15 via the closed bottom end 25. Many other configurations of the bag 15 are possible, as further discussed below. For example, other arrangements in which the bottom end 25 of the bag is closed in a manner other than sewing are possible. In various embodiments, the bag 15 can define a pinch-bottom-open-mouth configuration, quad-style configuration, heat-seal configuration, or other suitable configurations.

In some embodiments, the body portion 21 comprises a sheet of body material 7 that is folded or otherwise formed into the substantially tubular structure. As further discussed below, the body material 7 can comprise multiple layers, each of which can provide or aid in providing desirable functional characteristics to the bag 15.

Figure 2:
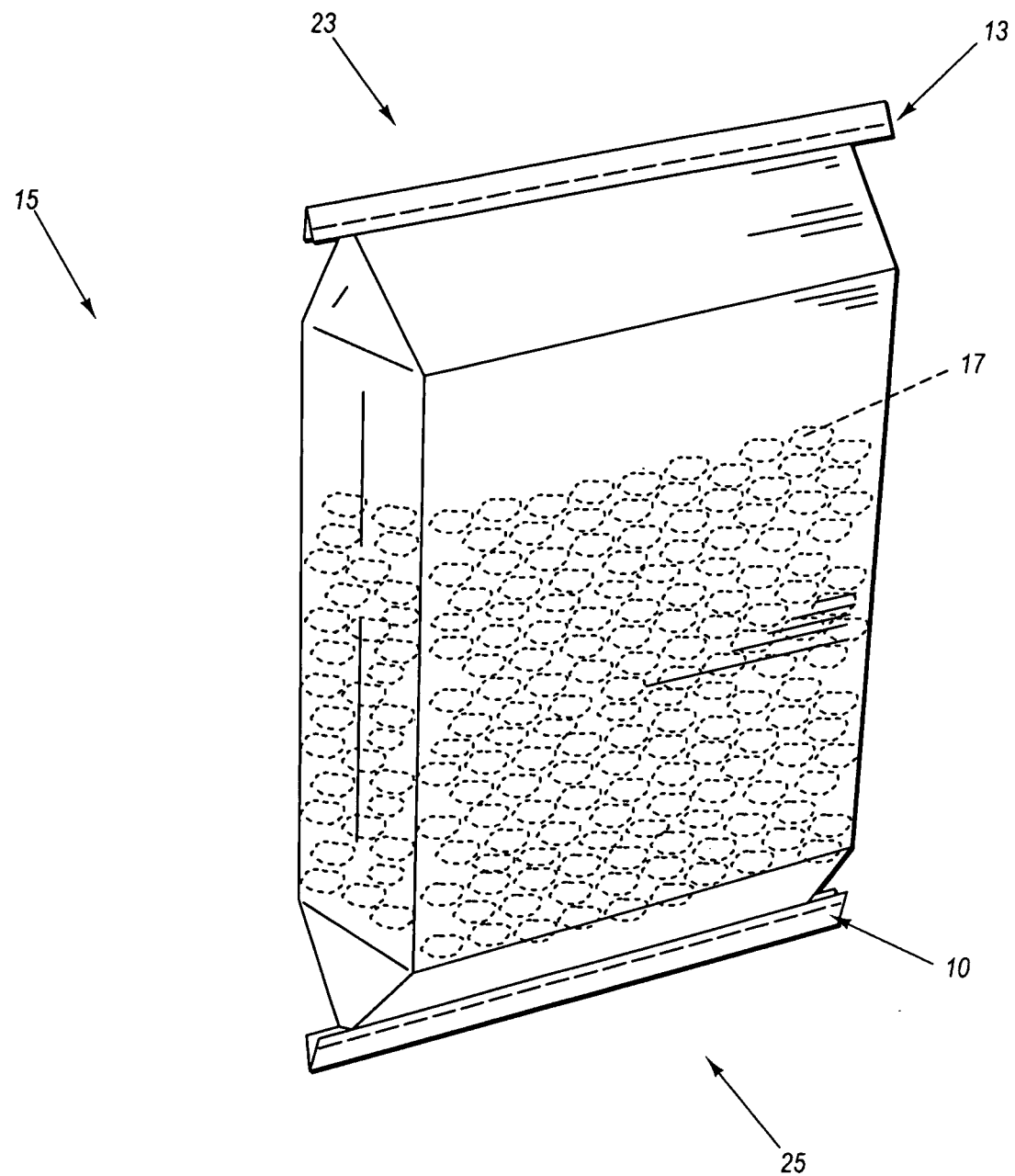
FIG. 2 illustrates a perspective view of the bag of FIG. 1 having a product disposed therein and two sewn ends.

With reference to FIG. 2, in certain embodiments, the bag 15 can have contents disposed therein, such as a product 17. Once the product 17 is within the bag 15, the top end 23 of the bag 15 can be closed in any suitable fashion, as discussed further below. For example, the illustrated embodiment includes a closure seam 13 such as the closure seam 10 at the bottom end 25 of the illustrated embodiment of the bag 15. Other closures are also possible, such as, for example, heat-seal closures or zipper closures.

Figure 3A:
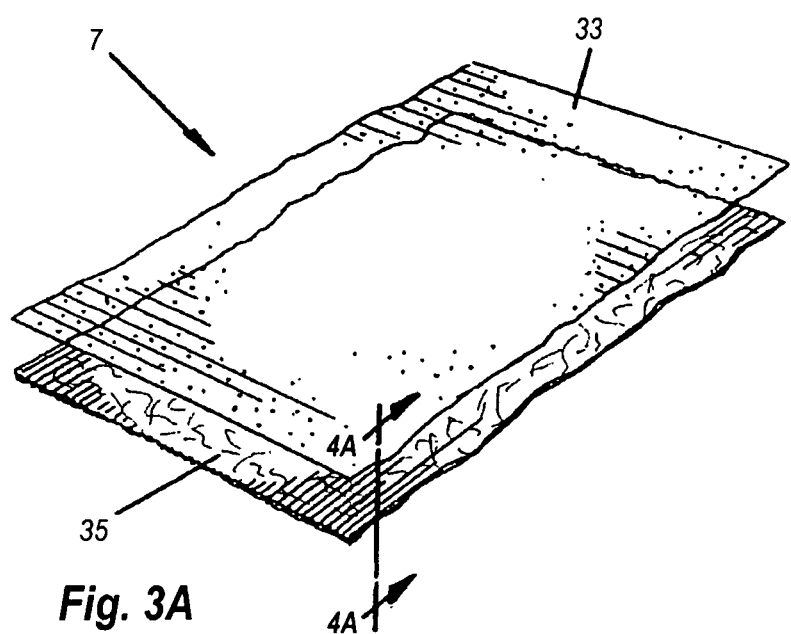
FIG. 3A illustrates an exploded view of an embodiment of a body material compatible with the bag of FIG. 1.
Figure 4A:
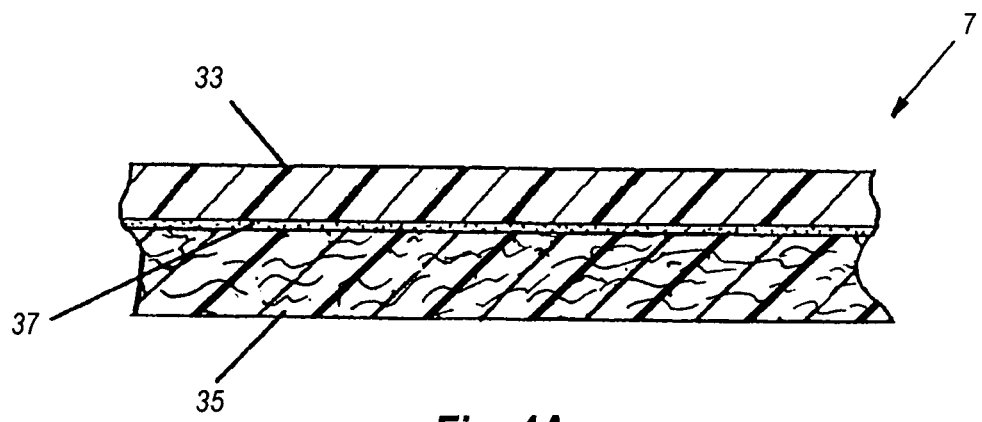
FIG. 4A illustrates a cross-sectional view of the body material of FIG. 3A taken along the view line 4A-4A in FIG. 3A.

With reference to FIGS. 3A and 4A, in certain embodiments, the body material 7 can comprise a film 33 and a nonwoven layer 35. The body material 7 can be oriented such that the film 33 is outside of the nonwoven layer 35. Stated otherwise, in some embodiments, the nonwoven layer 35 is closer to an interior space defined by the bag 15 than is the film 33.

The film 33 and the nonwoven layer 35 can be joined in any suitable fashion. For example, the film 33 and the nonwoven layer 35 can be laminated, such as via adhesive lamination or extrusion lamination. The film 33 can be adhered (e.g., in abutting contact) to an outer face of the nonwoven layer 35 via a tie layer 37. In various embodiments, the tie layer 37 can comprise a solventless adhesive, a plastic-type bonding material, or a co-extruded film. In some embodiments, the tie layer 37 comprises polyurethane. Other suitable materials are possible for the tie layer 37. For example, solvent-based adhesives may be used.

In certain embodiments, the film 33 and the nonwoven layer 35 are joined to each other using known laminating equipment. For example, in various embodiments, any suitable solventless laminator available from Comexi North America of West Springfield, Mass., any suitable solventless laminator available from Nordmeccanica of Piacenza, Italy, or the like can be used to laminate the film 33 to the nonwoven layer 35. In some embodiments, it can be desirable to control the viscosity of laminating materials used to join the film 33 and the nonwoven layer 35 so as to prevent seepage through the nonwoven layer 35. Such seepage could, in some instances, undesirably adhere a roll of newly prepared body material 7 to itself such that it would be difficult, damaging, or unfeasible to thereafter unroll the body material 7. The seepage could also interfere with proper operation of the laminating equipment.

Likewise, one or more known adhesives can be used to join the film 33 and the nonwoven layer 35. In some embodiments, the adhesive can comprise a water-adhesive in a mixture, or can comprise a 100% solids glue (as further discussed below). For example, in some embodiments, the adhesive can comprise a radiation-cured adhesive, a solventless adhesive, a solvent-based adhesive, or a water-based adhesive. In certain of such embodiments, precautions can be taken to prevent the adhesive from seeping through the nonwoven layer 35 prior to drying or curing. Such seepage could, in some instances, undesirably adhere a roll of newly prepared body material 7 to itself such that it would be difficult, damaging, or unfeasible to thereafter unroll the body material 7. For example, one alteration of conventional adhesive processes that could permit the use of water-based adhesives without undesirable seepage would be to permit the adhesive to dry prior to rolling the body material 7.

In other embodiments, extrusion coating lamination may be used. For example, in some embodiments, an extrusion coating lamination comprises the use of a PE blend as the extrudate. In other embodiments, a resin extrusion may be employed. In some embodiments, the lamination is performed via a separate piece of equipment designed for laminating and extruding, and in other embodiments, an in-line tuber is used. In some embodiments, any suitable extrusion laminator, such as one available from Davis-Standard of Pawcatuck, Conn., can be used.

In some embodiments, a so-called 100% solids adhesive may be used. For example, certain hot-melt adhesives can be suitable for joining the film 33 and the nonwoven layer 35. However, it may not be desirable for certain of such hot-melts to contact food. In some embodiments, the nonwoven layer 35 may not provide a sufficient barrier between these hot-melts and a packaged product 17, thus in such embodiments, the packaged product 17 can comprise something other than food. In some embodiments, it is possible to use a hot-nip roller to join the film 33 and the nonwoven layer 55.

In certain embodiments, the film 33 comprises a polyolefin, and may comprise a thermoplastic material. For example, in various embodiments, the film 33 comprises polyethylene terephthalate (PET), polyethylene terephthalate polyester (PETP), polytrimethylene terephthalate (PTT), polybutylene terephthalate (PBT), or polypropylene (PP). In some instances, PTT and PBT may be more expensive than PET. Certain films 33, such as some embodiments that comprise polyester (e.g., PETP), can be puncture-resistant, tear-resistant, scratch-resistant, grease-resistant, and/or absorption-resistant. These properties can aid in providing a bag 15 with, and in maintaining, an aesthetically pleasing appearance.

In some embodiments, the film 33 can include one or more materials configured to provide or enhance the grease-resistance or other barrier properties of the film 33. For example, in some embodiments, the film 33 can be resistant to or substantially impermeable to mineral oils, solvents, and acids. The film 33 can include, for example, plastics, polyvinyl chloride (PVC), polyamide (PA), polyethylene (PE), polystyrene (PS), and/or polypropylene (PP).

In some embodiments, the film 33 can be in a range of from about 30 gauge to about 300 gauge. In other embodiments, the thickness can be in a range from about 36 gauge to about 48 gauge. For example, in certain pet food bag applications, the film 33 can be about 48 gauge. The film 33, however, can have other gauges for pet food bags, or for other applications, as needed or desired.

Figure 3B:
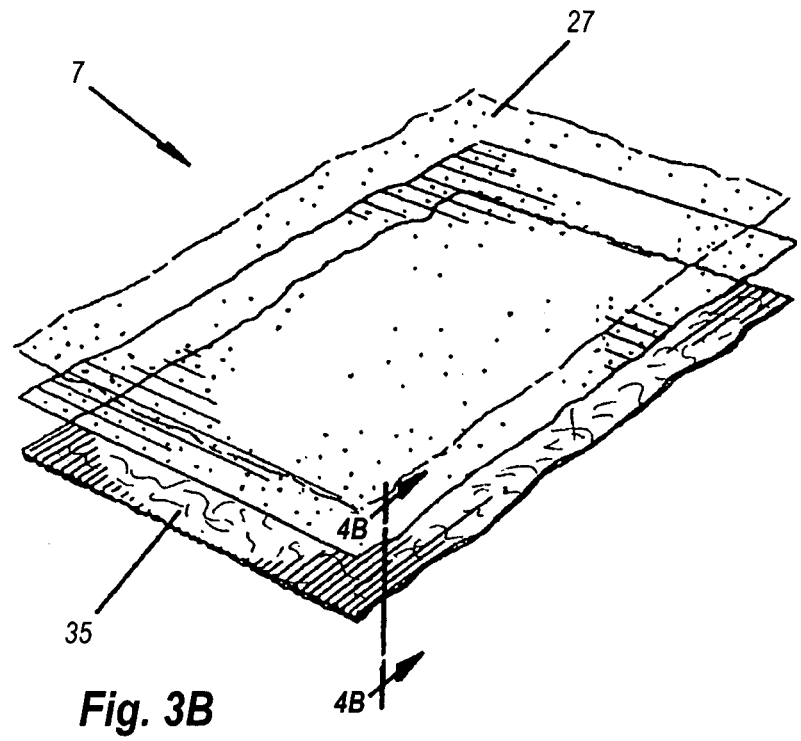
FIG. 3B illustrates an exploded view of another embodiment of a body material compatible with the bag of FIG. 1.
Figure 4B:
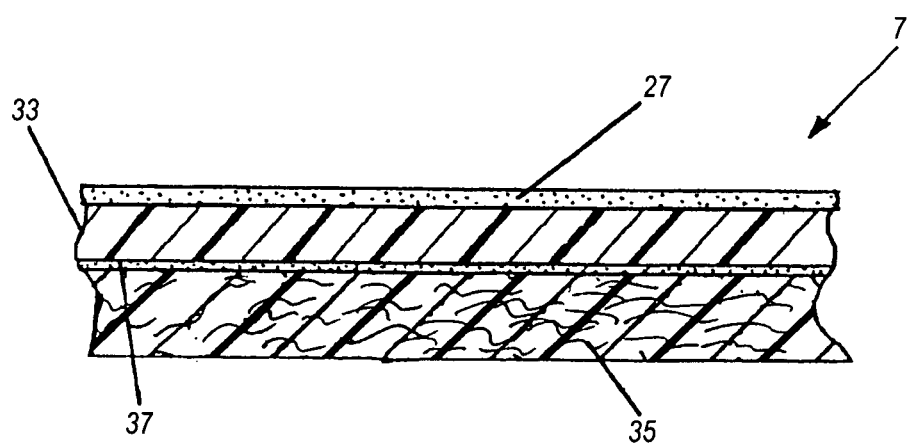
FIG. 4B illustrates a cross-sectional view of the body material of FIG. 3B taken along the view line 4B-4B in FIG. 3B.

With reference to FIGS. 3B and 4B, in certain embodiments, the film 33 can be treated with a coating 27 on the outer face thereof. The coating 27 can provide an enhanced barrier, and can inhibit or substantially prevent grease and/or moisture from penetrating the bag 15 from the outside. The coating 27 can protect against abrasion of the film 33, and may provide an aesthetically appealing gloss finish. In some embodiments, the coating 27 can facilitate adhesion and bonding and can increase a coefficient of friction of the bag 15. In some embodiments, the coating 27 can include printed indicia, which can be surface printed or reverse printed. In various embodiments, the coating 27 can comprise, for example, a flexography coating 27, a proprietary coating 27, or any other suitable coating 27. For example, in some embodiments, the coating 27 can comprise the proprietary coating REPEL-LENCE™ barrier coating or AQUA CRYSTAL™ film coating, each of which is manufactured by Exopack, LLC of Spartanburg, S.C.

In some embodiments, the coating 27 can provide oil, grease, and/or water resistance. The coating 27 can effectively preserve the quality of the package contents as well as the physical integrity of the bag 15 as a whole. For example, in some embodiments, a coating 27 that comprises REPEL-LENCE™ can be used advantageously with products that contain oil or grease, or for bags 15 that may occasionally be subjected to rain or other elements. In some embodiments, a coating 27 that comprises AQUA CRYSTAL™ can be relatively clear and glossy, thereby providing a bag 15 with an attractive appearance.

In still other embodiments, one or more additional polyolefin films 33 can be combined with the illustrated film 33. For example, an additional polyolefin film 33 can replace the coating 27, or in further embodiments, the additional polyolefin film can be joined with an outwardly facing surface of the illustrated film 33, and the coating 27 can be applied to an outwardly facing surface of the additional polyolefin film 33.

In certain embodiments, an outer face of the film 33 can have a coefficient of friction in a range of from about 0.5 to about 0.9. Other ranges and values are also possible. The coefficient of friction, for example, for certain pet food bag applications can be sufficiently large to inhibit slipping or sliding of a bag 15 when positioned on a shelf or cabinet.

Figure 3C:
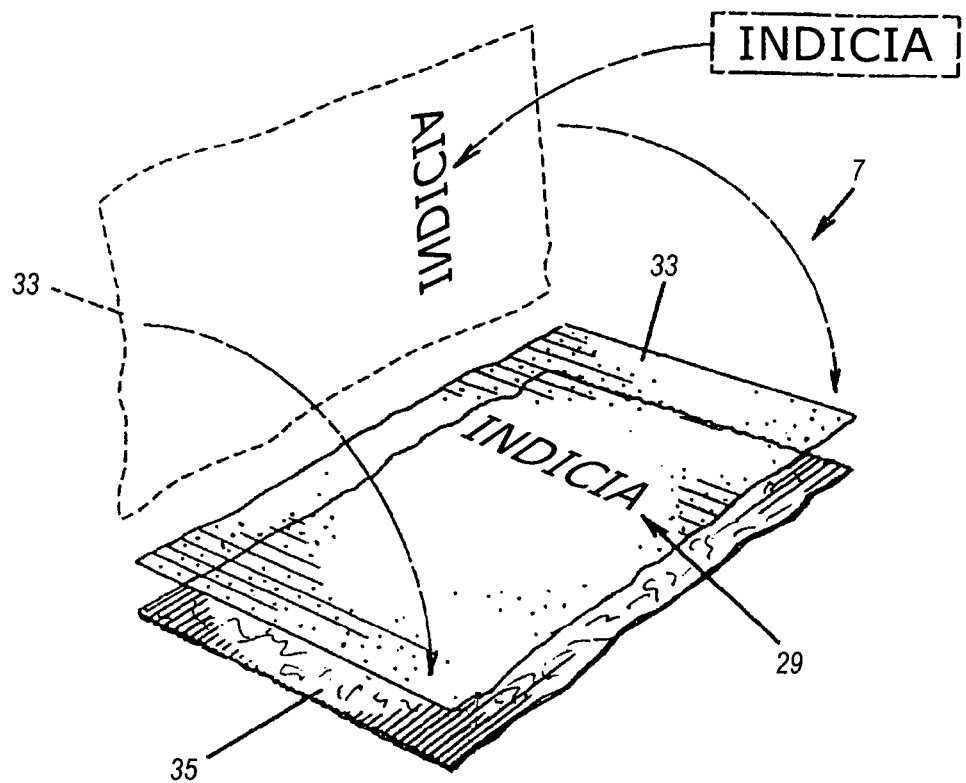
FIG. 3C illustrates an exploded view of another embodiment of a body material compatible with the bag of FIG. 1 in which a film portion of the outer ply is reverse printed.

With reference to FIG. 3C, in some embodiments, an inner face of the film 33 of the outer ply 31 can include printed indicia 29, which can aid in the identification and/or advertisement of the contents of the bag, the distributor of the bag, etc. In some embodiments, the film 33 exhibits properties (e.g., clarity, shininess, scratch resistance, etc.) that can enhance visual appearance of the bag 15, as described above. The film 33 can be configured to transmit light such that the printed indicia 29 is visible at a position outside of the bag 15.

In certain embodiments, the film 33 can be amorphous, which is a classification indicating that the film 33 is highly transparent and colorless, or can be semi-crystalline, which is a classification indicating that the film 33 is translucent or opaque with an off-white coloring. In some cases, amorphous polyester films 33 can have better ductility than semi-crystalline polyesters, but can exhibit less hardness and stiffness than the semi-crystalline type. In some embodiments, a film 33 can be printed with solvent-based inks or water based inks, and can be printed overall with a flood coat of white ink, which may advantageously allow for high-quality graphics. Certain embodiments that include a flood coat of white ink may also advantageously mask grease that might penetrate through the film 33 (e.g., via a cut or crack in the film 33). In some embodiments, portions of the film 33 are treated with an acrylic chemical suitable for adhering to solvent based inks, water based inks, or other inks.

In certain embodiments, instead of reverse printing indicia 29 on the inner face of the film 33, indicia 29 can be surface printed on the outer face of the film 33. It is also possible to print indicia 29 on both the inner and outer faces of the film 33. In other embodiments, the film 33 can be unprinted (e.g., the film 33 can be substantially plain and/or clear). The film 33 can provide a bag 15 with a superior appearance, as compared with, for example, standard pet food bags. For example, a printing on the film 33 can be more aesthetically pleasing than similar printing applied to paper bags (e.g., paper bags that do not have an outer film 33).

With reference again to FIGS. 3A-4B generally, in certain embodiments, the nonwoven layer 35 comprises a web of nonwoven material. As used herein, the term nonwoven material is a broad term used in its ordinary sense, and can include various materials that comprise a web of strands or fibers that are joined without a regular woven or knitted pattern. For example, separate fibers can be formed into a unitary piece of material via spunbonded and/or meltblown processes. In some embodiments, the web of nonwoven material can comprise fibers that are compiled via a binder (e.g., a powder, paste, or polymer melt), which may include a thermal bonding process (e.g., curing or calendering).

In various embodiments, the nonwoven material comprises polymeric fibers, cellulosic fibers, or some combination of the two. In some embodiments, the nonwoven material comprises polypropylene fibers, polyethylene fibers (e.g., high density polyethylene fibers), and/or polyester fibers sheathed in polyethylene, a co-polyester, and/or a copolymer of polyethylene. For example, various embodiments of the nonwoven material can comprise Tyvek® and/or Advanced Composite Technology (ACT) nonwovens, which are available from DuPont of Wilmington, Del. In still further embodiments, the nonwoven material can comprise cellulosic fibers, either instead of or in addition to polymeric fibers. The cellulosic fibers can also be sheathed, such as, for example, with polyester. Other nonwoven materials are also possible.

In some embodiments, the nonwoven material can provide a selective barrier. For example, in some embodiments, the nonwoven material can be substantially permeable to air and water vapor (e.g., breathable), yet can be substantially grease or water resistant. Accordingly, in some embodiments, combining the film 33 with the nonwoven layer 35 can advantageously increase the barrier properties a body material 7. For example, it may be desirable for a bag 15 to substantially prevent certain gases, odors, grease, and/or water from entering and/or exiting the bag 15, which may be more readily accomplished via the nonwoven layer 35, either alone or in conjunction with the film 33.

Although certain embodiments of a nonwoven layer 35 may be permeable to water vapor and/or certain gases and odors from within the bag 15, a film 33 that is joined to an exterior surface of the nonwoven layer 35 can prevent gases, odors, and/or water vapor that passes through the nonwoven layer 35 from exiting the bag 15, and can also prevent such items from entering the bag 15.

In many embodiments, the nonwoven layer 35 can provide the bag 15 with substantial toughness or strength. For example, the nonwoven layer 35 can be relatively puncture-resistant and/or relatively tear-resistant. Examples of such improved puncture- and tear-resistance are provided below. The improved strength can be advantageous in certain large-format applications. For example, in some embodiments, bags configured for carrying or storing heavy and/or abrasive loads (e.g., about 20 kg or more of pet food) can benefit from the strength of a nonwoven layer 35.

In certain embodiments, the nonwoven layer 35 can exhibit a bending stiffness, modulus, and/or tensile stiffness that is larger than that of the film 33. In further embodiments, the nonwoven layer 35 can be thicker than the film 33. In some embodiments, the nonwoven layer 35 can provide sufficient structural rigidity to permit the bag 15 to be placed in and remain in an upright position. For example, the bag 15 might contain a product 17 in an amount sufficient to fill only a fraction (e.g., ¼, ⅓) of the bag 15. In certain of such embodiments, the product 17 can be settled at the bottom end 25 of the bag 15, and the bag 15 can be set upright on its bottom end 25. Although the product 17 does not generally support the top end 23 of the bag 15 in such a configuration, the bag 15 can nevertheless remain in a substantially upright configuration, and can resist gravitational force acting on the top end 23

Industries of North Tonawanda, N.Y. Taber Stiffness Units can be defined as the bending moment of ⅕ of a gram applied to a 1.5 inch wide specimen at a 5 centimeter test length, flexing it to an angle of 15 degrees. Stiffness Units can be expressed in grams.

To obtain a reading of the Taber Stiffness of a test strip of material, the test strip can be deflected 7.5 degrees or 15 degrees in opposite directions (e.g., to the left and to the right). The average reading of the deflections can then be obtained. This average can then be multiplied using the appropriate number provided in Table 1 below for a particular range. The resultant product is the stiffness value of the material in Taber Stiffness Units.

TABLE 1

| Range | Stiffness Units | Test Length | Roller Position | Specimen Size | Weight | Angle of Deflection | Scaling Multiplier |
|---|---|---|---|---|---|---|---|
| 1 | 0-1 | 2 cm | SR Attachment | 1½ × 1½ | 10 unit compensator | 15° | 0.01 |
| 2 | 0-10 | 1 cm | Up | 1½ × 1½ | 10 unit compensator | 15° | 0.1 |
| 3 | 10-100 | 5 cm | Down | 1½ × 2¾ | — | 15° | 1 |
| 4 | 50-500 | 5 cm | Down | 1½ × 2¾ | 500 units | 15° | 5 |
| 5 | 100-1000 | 5 cm | Down | 1½ × 2¾ | 1000 units | 15° | 10 |
| 6 | 200-2000 | 5 cm | Down | 1½ × 2¾ | 2000 units | 15° | 20 |
| 7 | 300-3000 | 5 cm | Down | 1½ × 2¾ | 3000 units | 15° | 30 |
| 8 | 500-5000 | 5 cm | Down | 1½ × 2¾ | 5000 units | 15° | 50 |
| 9 | 1000-10000 | 5 cm | Down | 1½ × 2¾ | 5000 units | 7.5° | 100 | of the bag 15 due to the stiffness of the nonwoven layer 35. In some embodiments, dead-fold properties provided by a nonwoven layer 35 can be advantageous for similar reasons.

As used herein, the term stiffness is a broad term used in its ordinary sense, and can include bending stiffness or tensile stiffness. Other suitable measurements of stiffness can also be utilized, such as droop stiffness, folding endurance, or other alternative measurements. In certain instances, bending stiffness represents the rigidity of a material. In some cases, the bending stiffness of an item can be a function of (e.g., can be proportional to) the cube of the caliper thickness of the item. Bending stiffness can also be related to the modulus of elasticity of the item. In many embodiments, the bending stiffness of a nonwoven layer 35 generally increases as the thickness of the nonwoven layer 35 is increased.

Various instruments may be used to measure stiffness, many of which determine the stiffness of an item by subjecting it to bending of one variety or another. For example, some instruments employ 2-point bending, while others employ 4-point bending. Solid fiber boards and small fluted combined boards (which can be used in folding cartons) are typically measured with 2-point bending instruments. Suitable instruments for measuring bending stiffness can include Gurley, Taber, and L&W instruments.

Industry standards for measuring stiffness adopted by the Technical Association of the Pulp and Paper Industry (TAPPI) can be used to characterize the stiffness of a bag 15 or portions (e.g. layers) thereof. For example, the Gurley Stiffness value can be measured via a Gurley Stiffness Tester, manufactured by Gurley Precision Instruments of Troy, N.Y. The Gurley Stiffness Tester measures the externally applied moment required to produce a given deflection of a strip of material of specific dimensions fixed at one end and having a concentrated load applied to the other end. The results are obtained as "Gurley Stiffness" values, which can be in units of grams.

Similarly, stiffness can be measured in Taber Stiffness Units using a Taber® Stiffness Tester manufactured by Taber The following formula can apply to Taber Stiffness measurements:

$$E = 0.006832 \times (1/(w \times d^3 \times \theta)) \times S_T$$

where E is stiffness in flexure in pounds per square inch, w is specimen width in inches, d is the specimen thickness in inches, θ is the deflection of the specimen expressed in radians, and $S_T$ is Taber Stiffness Units.

There can be a reasonable correlation between Gurley Stiffness and Taber Stiffness, such as for paperboard grades. For example, the following formula can be used to convert between Gurley Stiffness and Taber Stiffness:

$$S_T = 0.01419 S_G - 0.935$$

where $S_T$ is Taber Stiffness Units and $S_G$ is Gurley Stiffness Units. As indicated in TAPPI Test Method T-543, paragraph 4.1.5, Gurley values can range from approximately 1.39 to 56,888 Gurley Stiffness units, and can correspond roughly to Taber values ranging from approximately 0 to 806.3 Taber Stiffness units.

In some embodiments, the stiffness of the nonwoven layer 35 is selected such that the body material 7 of which a bag 15 is ultimately formed can be laminated on existing machinery. Likewise, in some embodiments, the stiffness of the nonwoven layer 35 is selected such that the body material 7 can be formed into the bag 15 on a variety of existing converting equipment. For example, the body material 7 can be suitable for use with equipment generally used in the manufacture of large-format paper bags. In some embodiments, the nonwoven layer 35 can exhibit dead-fold properties similar those of paper layers commonly used in conjunction with such equipment. In further embodiments, the body material 7 can be used with standard quad-seal equipment.

In some embodiments, the nonwoven layer 35 can define a thickness in a range from about 1.0 mils to about 10 mils. In various embodiments, the thickness can be in a range from about 1.75 mils to about 7.0 mils or from about 1.9 mils to about 6.0 mils. In further embodiments, the thickness can be no less than about 1.9 mils, no less than about 2.0 mils, or no less than about 2.1 mils. Other thicknesses are also possible.

In some embodiments, the film 33 can define a thickness in a range of between about 0.25 mils and about 1.25 mils, between about 0.25 mils and about 0.75 mils, or between about 0.70 mils and about 1.25 mils. In some embodiments, the film 33 can be 48 gauge and/or have a thickness in the range of about 0.475 mils to about 0.485 mils. Increased thickness of the nonwoven layer 35 and/or the film 33 can provide for increased bending stiffness and increased stabilization of a bag 15. In some embodiments, the film 33 can comprise PET and can define a thickness within a range of between about 0.25 mils and about 0.75 mils. In other embodiments, the film 33 can comprise BOPP and can define a thickness within a range of between about 0.70 mils and about 1.25 mils.

In some embodiments, an outer face of the nonwoven layer 35 can include printed indicia. Procedures for printing indicia can include process printing, rotogravure printing, innovative flexographic printing, etc. In some embodiments, the film 33 does not include printed indicia 29 (see FIG. 4C) when the nonwoven layer 35 is printed, which can prevent the film 33 from obscuring the printed matter of the nonwoven layer 35. In other embodiments, both the nonwoven layer 35 and the film 33 can include printed portions.

Figure 5:
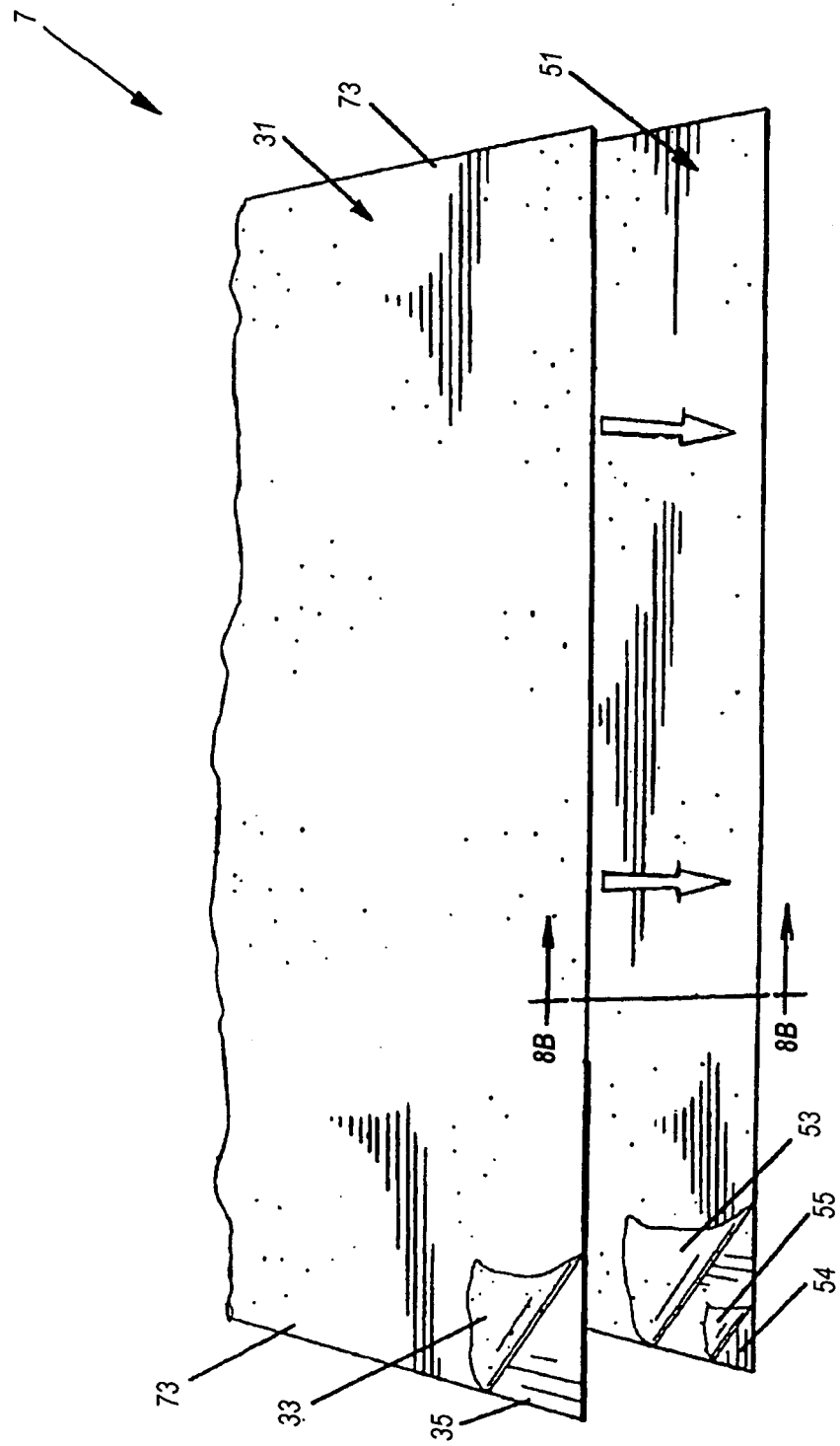
FIG. 5 illustrates a partially exploded view of another embodiment of a body material having an embodiment of an inner ply and an embodiment of an outer ply, and is compatible with the bag of FIG. 1.
Figure 6:
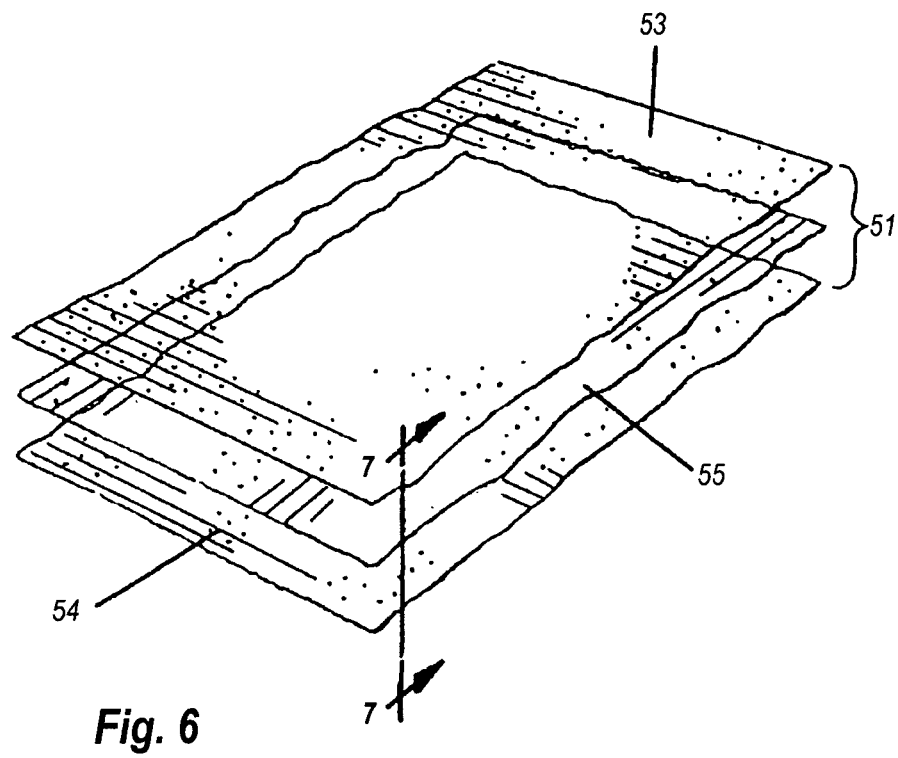
FIG. 6 illustrates a partial exploded view of an embodiment of an inner ply compatible with the body material of FIG. 5.
Figure 7:
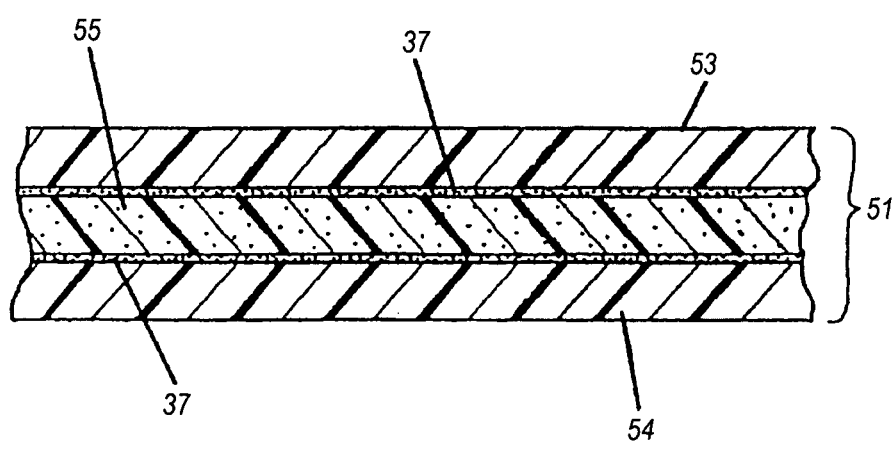
FIG. 7 illustrates a cross-sectional view of the inner ply of FIG. 6 taken along the view line 7-7 in FIG. 6.

With reference to FIG. 5, in certain embodiments, the film 33 and the nonwoven layer 35 can define an outer ply 31 that is joined to an inner ply 51 to define a body material 7. In some embodiments, an inner face of the outer ply 31 (e.g., an inwardly facing surface of the nonwoven layer 35) is adhered to an outer face of the inner ply 51 (e.g., an outwardly facing surface of the inner ply 51). In further embodiments, the inner and outer plies 51, 31 can be in abutting contact. For example, the inner ply 51 can be laminated to the outer ply 31.

With reference to FIGS. 5, 6, 7, 8B, and 8E, in some embodiments, the inner ply 51 comprises multiple layers. As shown in FIG. 8A, in other embodiments, the inner ply 51 comprises a single layer. In either case, the inner ply 51 can be configured to resist or prevent the penetration or absorption of grease, mineral oils, solvents, and acids into or through the walls 1, 2, 3, 4 of a bag 15. The inner ply 51 can thus advantageously prevent grease within the bag 15 from contacting the nonwoven layer 35.

In some embodiments, the inner ply 51 exhibits a high degree of puncture resistance. This property can also be advantageous depending on the type of product stored in a bag 15. For example, in some embodiments, the packed product can be relatively abrasive such that the inner ply 51 is desirably capable of withstanding the formation of pinholes during transportation and/or use of the bag 15.

In some embodiments, the inner ply 51 comprises a high modulus (e.g., modulus of elasticity) such that the inner ply 51 is able to elastically stretch. When incorporated into the multi-layered material that forms the body portion 21 of a bag 15, such an inner ply 51 can provide the bag 15 with resiliency, which can help to prevent rips, tears, or punctures. As further discussed below, in some embodiments, the resiliency afforded by the inner ply 51 can aid in sealing holes created by a sewing needle during assembly of a bag 15.

With reference to FIG. 8A, in certain embodiments, the inner ply 51 can include a single-layer or mono-layer film, which can be grease resistant or can include one or more grease-resistant components. In some embodiments, the inner ply 51 can comprise a polyolefin film layer or a laminate. For example, in certain embodiments, the inner ply 51 comprises nylon or polypropylene. In some embodiments, the inner ply 51 comprises biaxially oriented polypropylene (BOPP). In other embodiments, the inner ply 51 can comprise a material of which merely a component is nylon (e.g., a suitable polyamide) or polypropylene, and can include other materials capable of resisting grease. Some grease-resistant materials can include, for example, metalized films, ethylene vinyl alcohol, polyester, or specialty resins. In some embodiments, the grease-resistant materials provide resistance to and/or prevention of the penetration or absorption of grease, mineral oils, solvents, and/or acids.

In certain embodiments, the inner ply 51 comprises a single layer of polypropylene film. In various embodiments, the polypropylene inner ply 51 can exhibit relatively high grease-resistance, rigidity, translucence, chemical resistance, toughness, fatigue resistance, integral hinge properties, and/or heat resistance. Various forms of polypropylene are possible, and may be selected based on particular needs and cost considerations. For example, the inner ply 51 can comprise homopolymers, block copolymers, or random copolymers. Homopolymers, in this sense, are a general purpose grade polypropylene. Block copolymers can incorporate 5-15% ethylene and have much improved impact resistance extending to temperatures below −20 degrees C. In some instances, the toughness of block copolymers can be increased by the addition of impact modifiers, such as elastomers, in a blending process. Random copolymers can incorporate co-monomer units arranged randomly (as distinct from discrete blocks) along the polypropylene long chain molecule, typically contain 1-7% ethylene, and can be used where a relatively low melting point, relatively high flexibility, and clarity are desired.

In certain embodiments, the inner ply 51 comprises a single layer of nylon film. A nylon inner ply 51 can have such properties as relatively high wear and abrasion resistance, relatively high strength, and/or a relatively high modulus (e.g., modulus of elasticity).

With reference again to FIGS. 5, 6, 7, 8B, and 8E, in certain embodiments, the inner ply 51 includes a multi-layer film or laminate. The inner ply 51 can comprise a core layer 55 positioned between one or more films 53, 54. For example, an inner face of a first film 53 can be abuttingly adhered to an outer face of a core layer 55 and/or an inner face of the core layer 55 can be abuttingly adhered to an outer face of a second film 54. In some embodiments, the core layer 55 and the one or more films 53, 54 are co-extruded such that the inner ply 51 comprises at least three co-extruded layers. Other suitable laminated structures are also possible. For example, in some embodiments, the inner ply 51 comprises four or more co-extruded layers or five or more co-extruded layers. The core layer 55 can be positioned at a center of the inner ply 51 in some embodiments, and in other embodiments, can be at an off-centered position.

One or more of the core layer 55, the films 53, 54, and/or other layers of a ply 51 can comprise any suitable combination of the materials discussed above with respect to the single-layer inner ply 51. In some embodiments, the core layer 55 comprises nylon or polypropylene. In other embodiments, the core layer 55 can comprise a metalized film, ethylene vinyl alcohol, polyester, or a specialty resin. In some embodiments, the core layer 55 is substantially grease-proof, is highly puncture resistant, and/or comprises a high modulus.

In some embodiments, one or more of the films 53, 54 and/or additional co-extruded layers of the inner ply 51 can comprise polyethylene, linear low density polyethylene, or metalicine. Other materials are also possible. In various embodiments, one or more of the films 53, 54 and/or additional co-extruded layers of the inner ply 51 can define a thickness of between about 0.5 mils and about 6.0 mils.

In certain embodiments, one or more of the films 53, 54 can be heat-sealable, which can be advantageous for certain uses of a bag 15 or in certain manufacturing procedures used to construct the bag 15. For example, one or more of the films 53, 54 can be configured to advantageously melt and closingly seal at least one of the bag ends 23, 25 in response to the application of heat. As another example, in some embodiments, an inner film 54 that is heat-sealable can advantageously be coupled to a zipper closure, as further discussed below. In certain embodiments, one or more of the films 53, 54 can comprise heat-sealable polyethylene (PE) or oriented polypropylene (OPP). In some embodiments, the core layer 55 can be heat-sealable. Such an arrangement can be advantageous, such as when the inner ply 51 does not include an inner film 54.

In certain embodiments, the inner ply 51 defines a thickness in a range of between about 0.5 mils and about 7.0 mils. In some embodiments, the thickness is in a range of between about 2.0 mils and about 6.0 mils. Other thickness ranges or gauge values are also possible, and can depend on the use of a bag 15 into which the inner ply 51 is incorporated. For example, in some embodiments, relatively large or heavy bags (e.g., bags having a capacity of about 20 kilograms or more) can benefit from a relatively thicker inner ply 51. Similarly, in some embodiments, bags used to store relatively sharp or abrasive products can benefit from a relatively thicker inner ply 51.

Where the inner ply 51 is formed by a laminated material, the first and second films 53, 54 can be adhered to the core layer 55 of the inner ply 51 in any suitable manner, such as those described above with respect to joining layers of the outer ply 31. For example, in some embodiments, the first and second films 53, 54 can be adhered to the core layer 55 via one or more tie layers 37. In certain embodiments, one or more of the tie layers 37 chemically bond the respective films 53, 54 to the layer 55. For example, in some embodiments, one or more of the tie layers 37 comprise a functionalized polyethylene copolymer. The one or more tie layers 37 can comprise other suitable adhesives.

With reference to FIGS. 8A and 8B, in some embodiments, the outer ply 31 is joined to an outer face of the inner ply 51. Any suitable method for joining the outer ply 31 and the inner ply 51 is contemplated, including any suitable method described above with respect to joining embodiments of the film 33 and nonwoven layer 35 of the outer ply 31. For example, the inner ply 51 and the outer ply 31 can be joined via co-extrusion. In some embodiments, such as those illustrated in FIGS. 8A and 8B, the inner ply 51 and the outer ply 31 are joined via an adhesive 38. Any other suitable lamination technique is also possible.

Figure 8D:
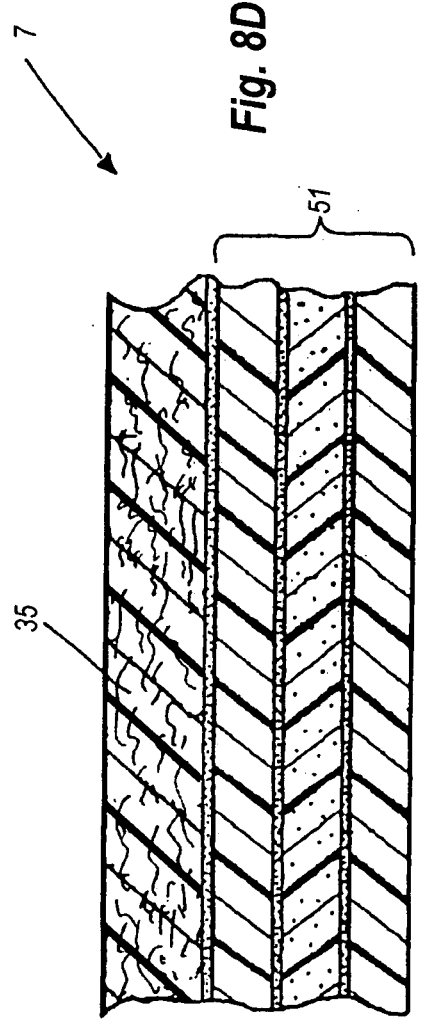
FIG. 8D illustrates a cross-sectional view of another embodiment of a body material compatible with the bag of FIG. 1.
Figure 8C:
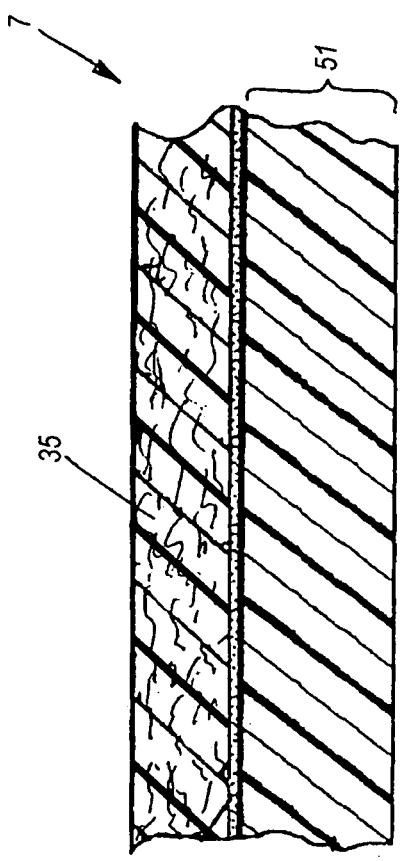
FIG. 8C illustrates a cross-sectional view of another embodiment of a body material compatible with the bag of FIG. 1.

With reference to FIGS. 8C and 8D, in some embodiments, the nonwoven layer 35, without the film layer 33, is joined to the inner ply 51. As previously discussed, the inner ply 51 can comprise a single layer (as illustrated in FIG. 8C) or multiple layers (as illustrated in FIG. 8D). In other embodiments, the "inner ply" 51 shown in each of FIGS. 8C and 8D, respectively, can be joined to an outer face of the nonwoven layer 35.

Figure 8E:
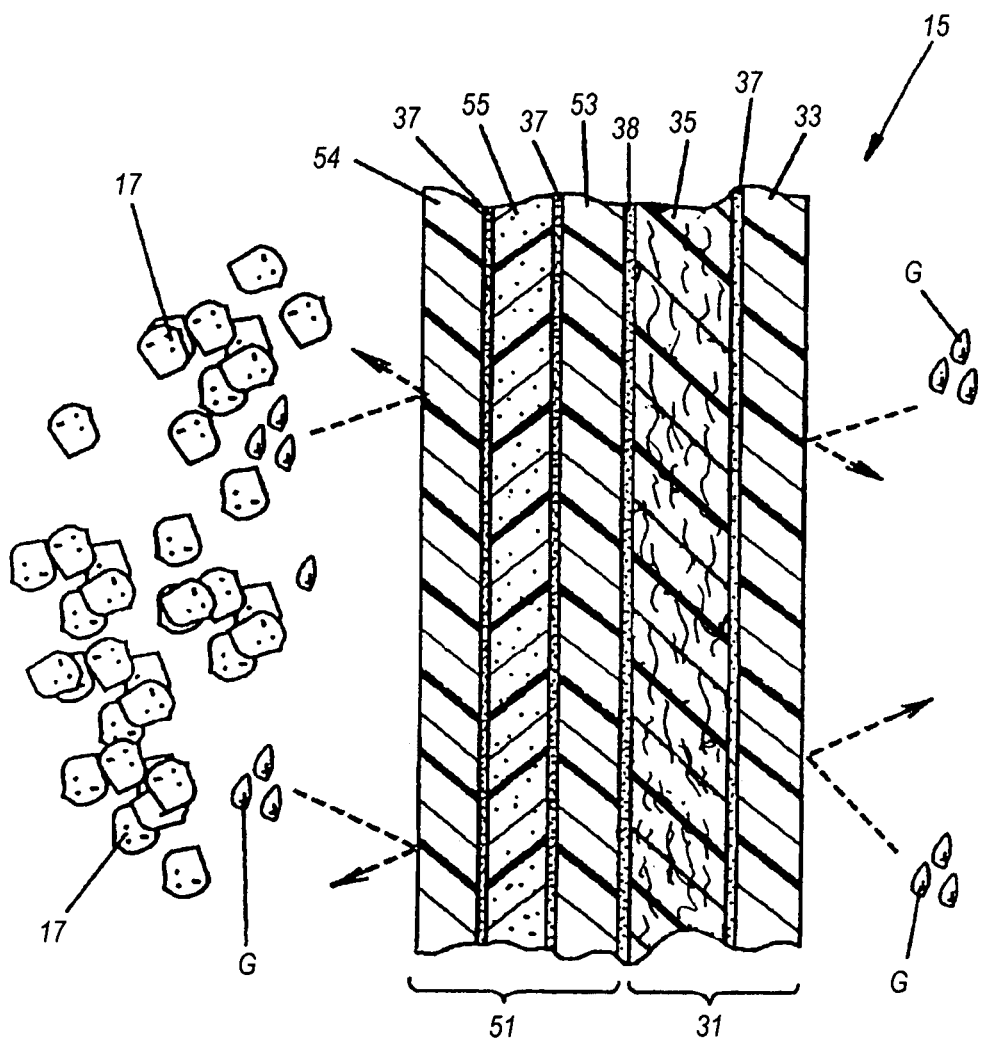
FIG. 8E illustrates grease-resistant properties of an embodiment of a body material such as that shown in FIG. 8B of which a portion is shown in cross-section.

FIG. 8E, schematically illustrates that in some embodiments, the bag 15 can substantially prevent grease G from a product 17 from migrating or penetrating from within the bag 15 to a position outside the bag 15. In further embodiments, the bag 15 can prevent grease at a position outside of the bag 15 from migrating into or otherwise penetrating the bag 15. The bag 15 can also substantially block or serve as a barrier to elements other than grease, such as, for example, liquids, odors, insects, etc., as previously discussed.

In various embodiments, the outer ply 31 and/or the inner ply 51 can comprise separate layers configured to provide a specific quality or property to the body material 7, as needed or desired. For example, as previously discussed, coatings may be applied to an exterior surface of the material 7 to enhance the appearance of a finished product, and one or more polymer-based films can provide heat-sealing capabilities, improved barrier qualities, and/or other desirable functionalities. In some embodiments, one or more paper layers may be included in one or more of the inner and outer plies 51, 31 to provide strength or some other desired property. For example, in some embodiments, a paper layer can be included between the film 53 and the nonwoven layer 35.

Figure 9:
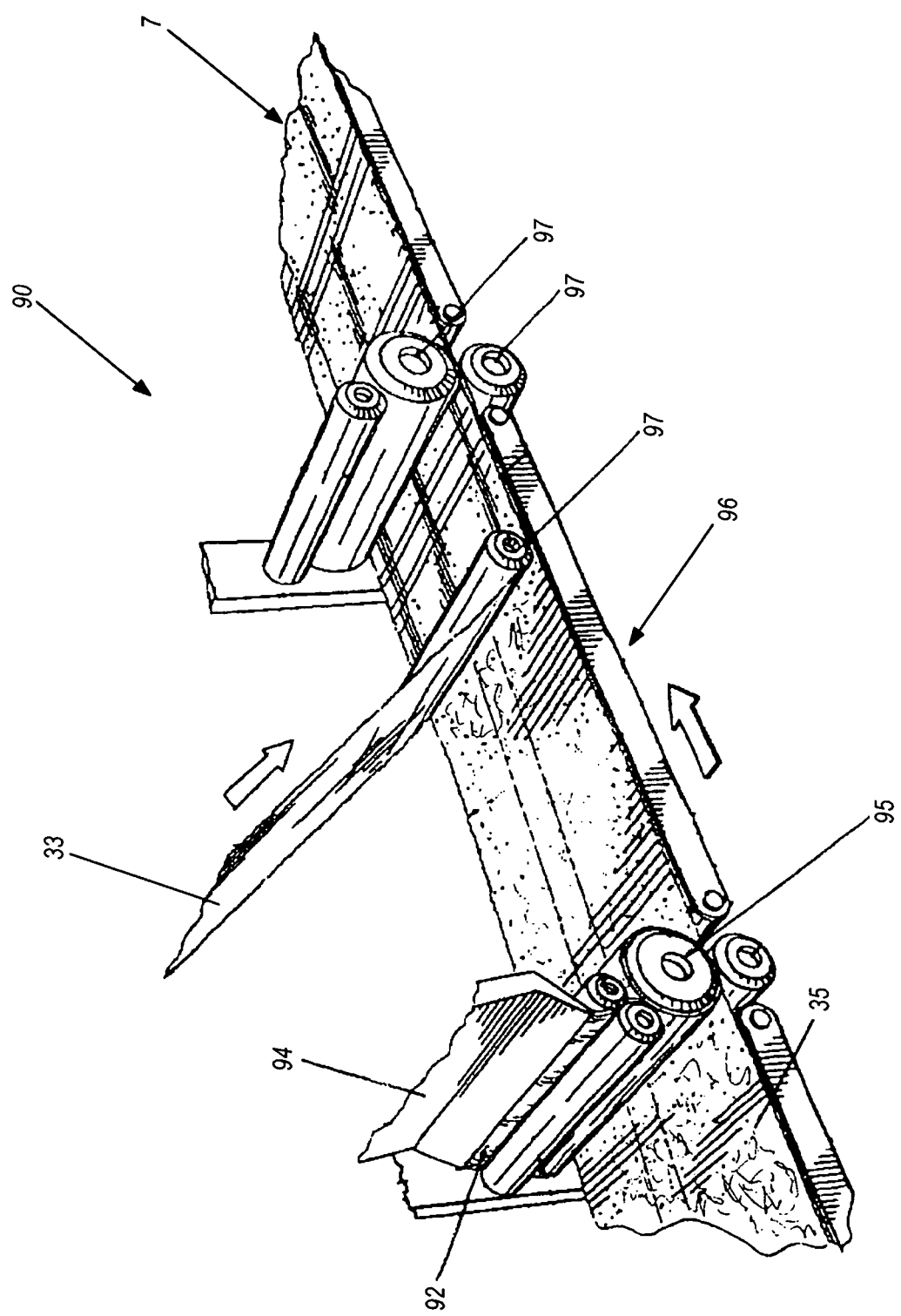
FIG. 9 illustrates an embodiment of an apparatus for forming a body material compatible with the bag of FIG. 1.

FIG. 9 illustrates an embodiment of an assembly apparatus 90 suitable for assembling the body material 7 from separate stocks of the nonwoven layer 35 and the film 33. In some embodiments, adhesive 92 is fed from an adhesive feeder 94 into an adhesive applicator 95, which can comprise a series of rollers. The adhesive 92 is evenly applied to a first surface of the nonwoven layer 35 as it is passed along a conveyor belt 96. The film 33 is applied to the adhesive-coated surface of the nonwoven layer 35 via a series of rollers 97. In further embodiments, an inner ply 51 can be applied to a second surface of the nonwoven layer 35 in a similar manner. Other suitable assembly apparatus 90 can be used, including those known in the art and those yet to be devised.

Figure 10:
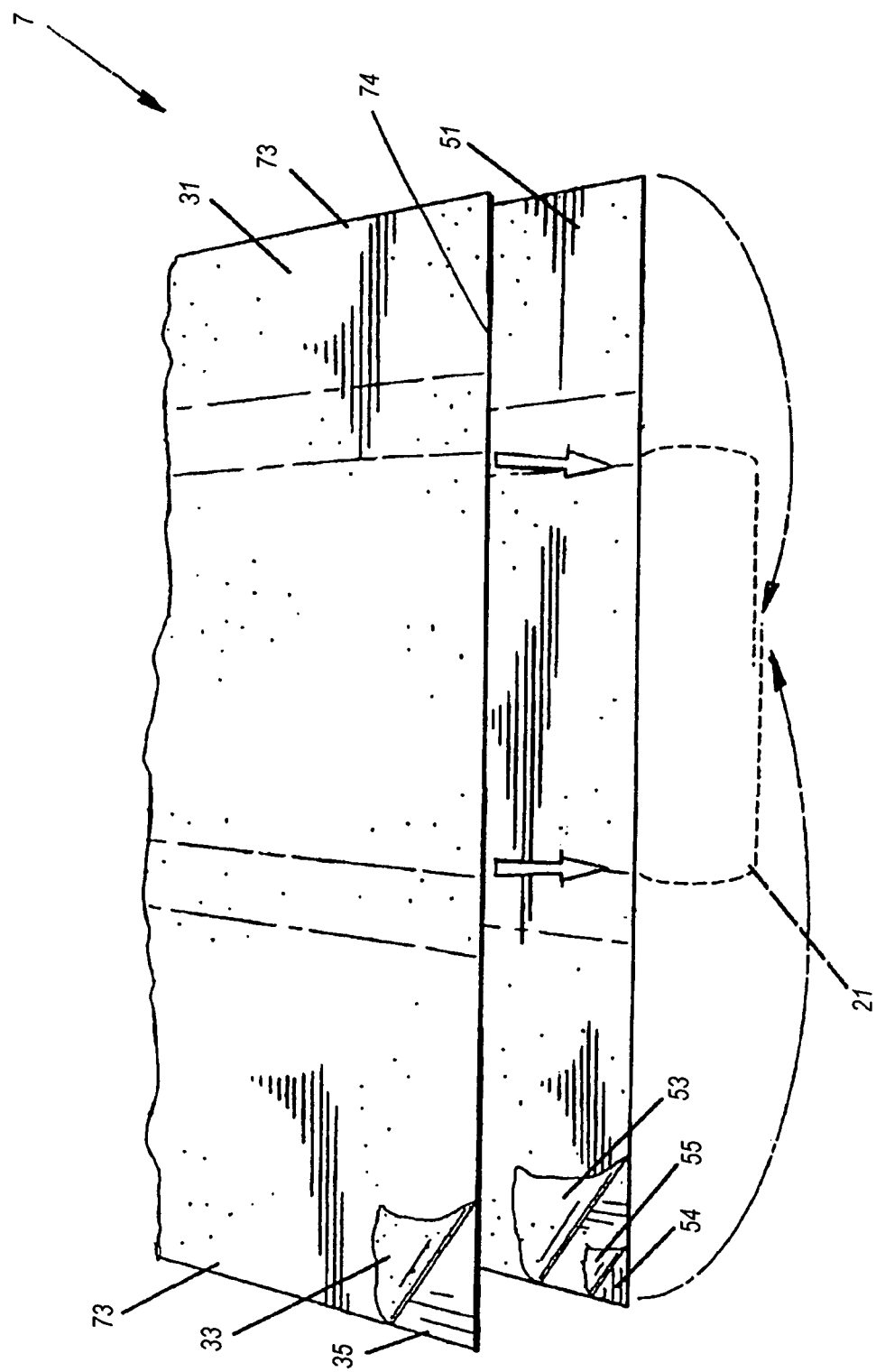
FIG. 10 illustrates a partially exploded view of an embodiment of material such as that of FIG. 7 that is capable of being formed into a tube-like structure.
Figure 11:
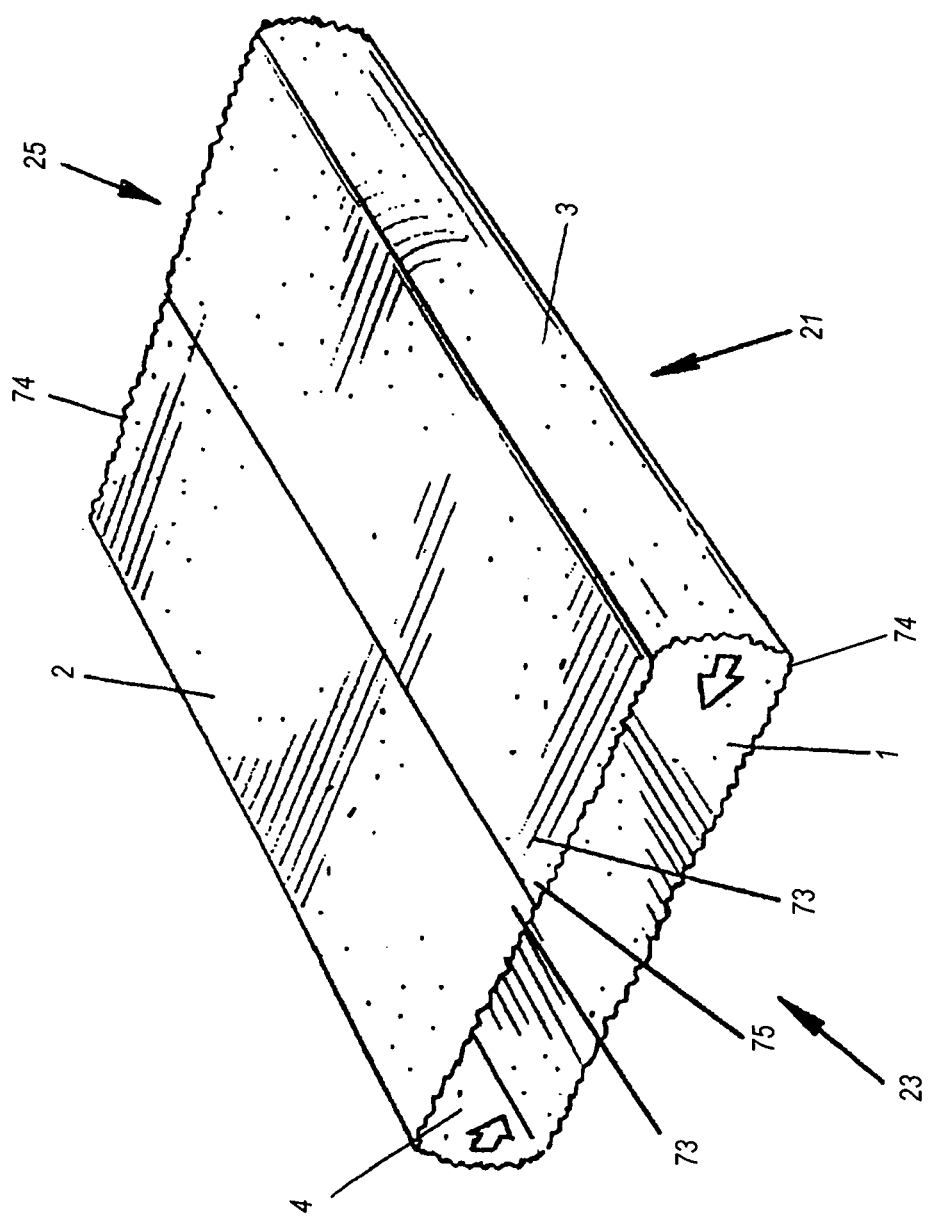
FIG. 11 illustrates a perspective view of the material of FIG. 10 in the form of an embodiment of a tube.

With reference to FIGS. 10 and 11, in some embodiments, any suitable embodiment of a body material 7 described herein can be converted into a bag 15. For example, the material 7 can comprise an outer ply 31 joined to an inner ply 51, and the outer and inner plies 31, 51 can be formed into a bag 15. In some embodiments, the outer and inner plies 31, 51 can be substantially coextensive with each other, save for a protruding salvage edge. For example, in some embodiments, the outer ply 31 overlaps the inner ply 51 and is defines a surface area that is slightly larger than that of the inner ply 51 such that a portion of the outer ply 31 extends past a peripheral edge of the inner ply 51 to define a salvage edge, as this term is understood in the art. In other embodiments, the inner ply 51 can define a salvage edge. In further embodiments, the inner ply 51 can define a surface area that is larger than that of the outer ply 31, or the inner ply 51 and the outer ply 31 can define surface areas that are substantially the same.

In certain embodiments, the body material 7 is cut or otherwise formed such that it has opposing lateral sides 73. In some embodiments, the lateral sides 73 are overlapped and joined to each other to define a tubular body 21. The lateral sides 73 can be joined in any suitable manner. For example, in some embodiments, one lateral side 73 is joined to the other lateral side 73 via an adhesive. In other embodiments, the film 33 of the outer ply 31 and the film 54 of the inner ply 51 can comprise heat-sealable materials such that the lateral sides 73 can be joined via a heat seal. In certain embodiments, a portion of the film 54 overlies a portion of the film 33 to define a seam 75, which can extend along a full longitudinal extent of the tubular body 21.

With reference generally to FIGS. 1, 11, 12, and 13, in certain embodiments, at least one end 23, 25 of the tubular body 21 can be sewn closed to provide a bag 15 in a sewn-open-mouth configuration (e.g., having a first end that is sewn closed and a second end that is open). In some embodiments, the bottom end 25 of the bag 15 comprises a closure seam 10 and the top end 23 is left open such that a product can be received into the bag 15 via the top end 23.

Figure 12:
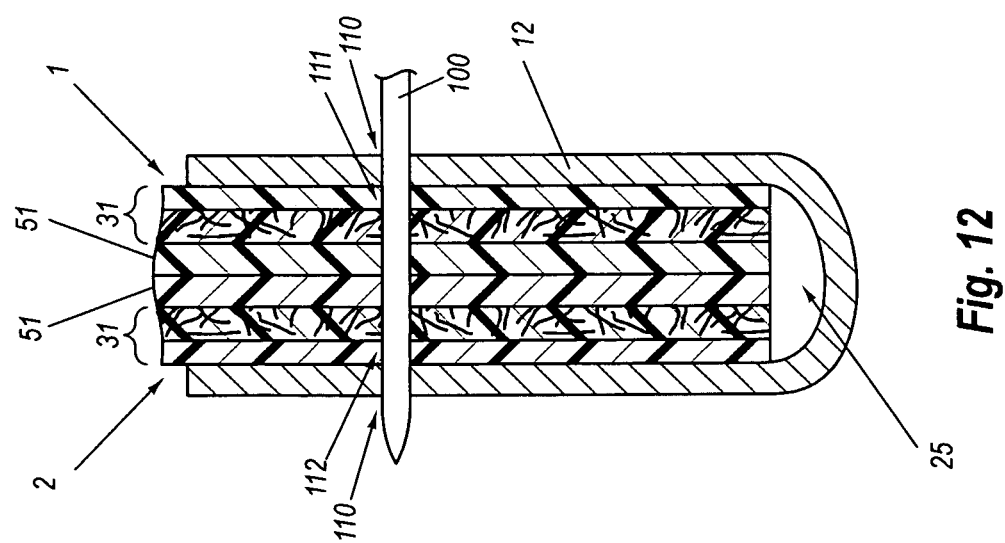
FIG. 12 illustrates a cross-sectional view of a sewing needle penetrating an end portion of material during formation of an embodiment of a bag.

With reference to FIGS. 11 and 12, in some embodiments, a method of forming the bag 15 into a sewn-open-mouth configuration includes urging the front wall 1 and the back wall 2 of the tubular body 21 toward one another. Although each of the front and back walls 1, 2 in the embodiment shown in FIG. 12 comprises three layers (i.e., a two-layered outer ply 31 and a single-layered inner ply 51), any suitable layered arrangement disclosed herein is possible. As shown in FIG. 12, The front wall 1 and the back wall 2 can be placed in abutting contact with each other. In further embodiments, a closure strip 12 is placed over the bottom end 25 of the front and back walls 1, 2. For example, the closure strip 12 can be folded or bent such that a portion of the closure strip 12 contacts an outer surface of the front wall 1 and another portion of the closure strip 12 contacts an outer surface of the back wall 2.

Figure 13A:
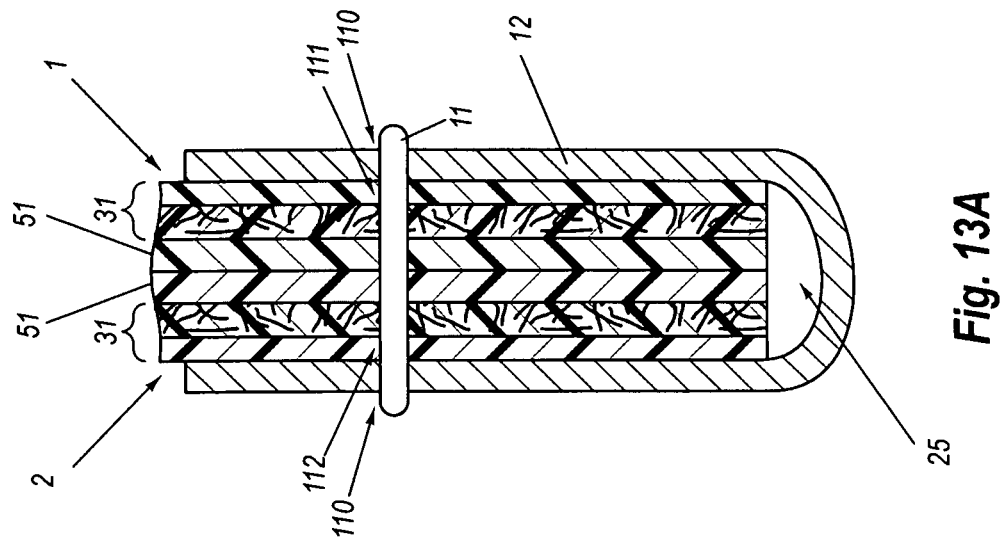
FIG. 13A illustrates a cross-sectional view of a portion of an embodiment of a bag through which an embodiment of a stitching element extends.

With reference to FIGS. 12 and 13A, in some embodiments, a stitching element 11 is introduced into a bottom region of the tube body 21 via a stitching needle 100. The stitching needle 100 can be configured to pierce through a first portion of the closure strip 12, the front wall 1, the back wall 2, and a second portion of the closure strip 12. The stitching needle 100 thus can form openings 110 in the closure strip 12, an opening 111 in the front wall 1, and an opening 112 in the back wall 2.

In some embodiments, the stitching needle 100 carries the stitching element 11 through the openings 110, 111, 112 and positions a portion of the stitching element 11 within the openings 110, 111, 112. Accordingly, upon removal of the stitching needle 100 from the bottom end 25 of the tube body 21, the stitching element 11 can extend through the openings 110, 111, 112 in a substantially fixed state.

The stitching element 11 can hold the front wall 1 and the back wall 2 in close engagement with one another so as to form a substantially grease-impermeable seal. As used herein the term grease-impermeable seal is used in its ordinary sense, and can include a seal that prevents the passage of grease thereby. Accordingly, a substantially grease-impermeable seal formed at a bottom end 25 of a bag 15 can substantially prevent grease from entering or exiting the bag 25 via the bottom end 25. As illustrated in FIG. 1, in some embodiments, the stitching element 11 can extend across a full transverse width of the bag 15 (e.g., from one lateral edge of the front wall 1 to an opposing lateral edge of the front wall 1), and can form a substantially grease-impermeable seal along the full transverse width of the bag 15. In further embodiments, the substantially grease-impermeable seal can also substantially prevent the passage of odors via the seal.

In some advantageous embodiments, the front and back walls 1, 2 are configured to close around the stitching element 11 upon removal of the stitching needle 100. For example, in some embodiments, the memory of the inner ply 51 (or a portion thereof, such as a core layer 55) is sufficiently large to permit the inner ply 51 to elastically deform as the stitching needle 100 passes through it. Upon removal of the needle 100, the inner ply 51 can move toward a more relaxed, more natural, or more constricted configuration and can close around the stitching element 11. The inner ply 51 can contact, constrict, or otherwise interact with the stitching element to form a substantially grease-impermeable seal. In some embodiments, a substantially grease-impermeable seal formed between the front and back walls 1, 2 and the stitching element 11 at the openings 111, 112 can substantially prevent the passage of odors via the seal.

In some embodiments, the outer ply 31 can form, or contribute to the formation of, a substantially grease-impermeable seal between the front and back walls 1, 2 and the stitching element 11. For example, in some embodiments, the memory of the outer ply 31 (or a portion thereof, such as the film 33) is sufficiently large to permit the outer ply 31 to elastically deform as the stitching needle 100 passes through it and to move toward a more constricted state upon removal of the needle 100.

In some embodiments, the memory of a material is affected by the thickness of the material. The term "memory" is used herein in its ordinary sense, and can include a property of the material by which the material can be stretched from a first position to a second position, and upon release from the second position, can completely return, or can return by a percentage amount, to the first position. By way of example, in some instances, PET films have a relatively low memory and PE films have a relatively high memory. In many instances, the memory of a material increases as the thickness of the material increases. In various embodiments, the thickness of the inner ply 51, or a portion thereof (e.g., the core layer 55), is between about 1 mil and about 6 mils, between about 2 mils and about 5 mils, or between about 3 mils and about 4 mils. In various embodiments, the thickness of the outer ply 33, or a portion thereof (e.g., the film 33), is between about 1 mil and about 6 mils, between about 2 mils and about 5 mils, or between about 3 mils and about 4 mils.

In certain embodiments, the stitching element 11 can comprise a material configured to interact with one or more materials of the front and back walls 1, 2 to form a substantially grease-impermeable seal therewith. In various embodiments, the stitching element can comprise cotton, a polyolefins, and/or a blend of synthetic materials and cotton.

Figure 13B:
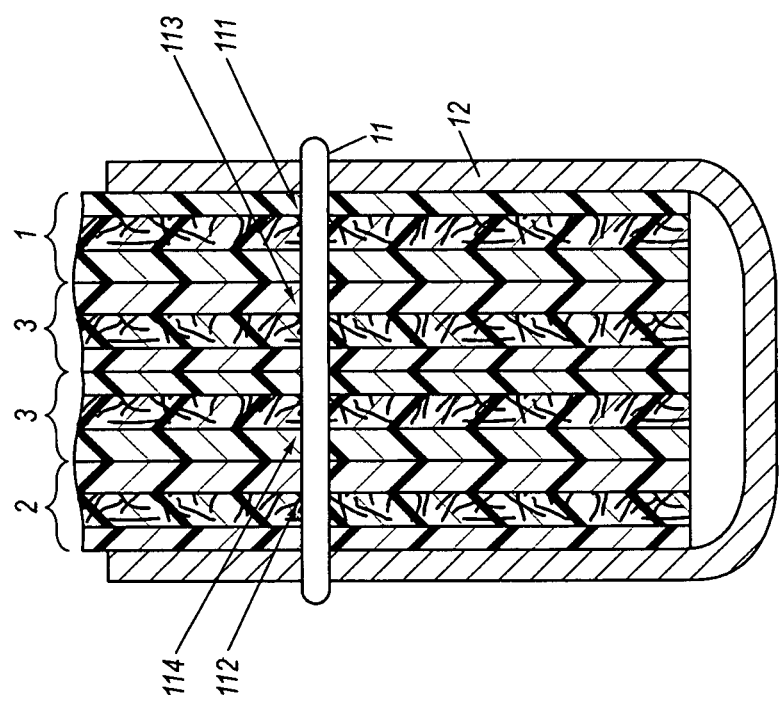
FIG. 13B illustrates a cross-sectional view of another portion of the bag of FIG. 13A through which an embodiment of a stitching element extends.

As illustrated in FIGS. 1, 2, 11, and 13B, in certain embodiments, a bag 15 can be formed with gusseted sidewalls 3, 4. With reference to FIG. 11, in some embodiments, the sidewalls 3, 4 of the tube body 21 can be urged inward to form the gussets, as depicted by block arrows, and can be creased or folded. With reference to FIG. 13B, in some embodiments, the stitching element 11 can extend through two separate portions of a gusseted side wall (e.g., the side wall 3). In the illustrated embodiment, the front wall 1 defines the opening 111, the back wall defines the opening 112, a first portion of the side wall 3 defines a third opening 113, and a second portion of the side wall 3 defines a fourth opening 114. The stitching element 11 can extend through the first, second, third, and fourth openings 111, 112, 113, 114 in a substantially fixed state. The stitching element 11 can hold the front wall 1 and the first portion of the side wall 3 in close engagement with one another so as to form a substantially grease-impermeable seal. Similarly, the stitching element 11 can hold the second portion of the side wall 3 and the back wall 2 in close engagement with one another so as to form a substantially grease-impermeable seal.

With reference to FIG. 2, in some embodiments, a product 17 can be introduced into the bag 15 after a closure seam 10 has been formed at the bottom end 25 of the bag 15. In further embodiments, the top end 23 of the bag 15 can then be sealed in any suitable fashion. For example, as discussed above, in some embodiments, a closure seam 13 such as the closure seam 10 is provided at the top end 23 of the bag 15.

Figure 14:
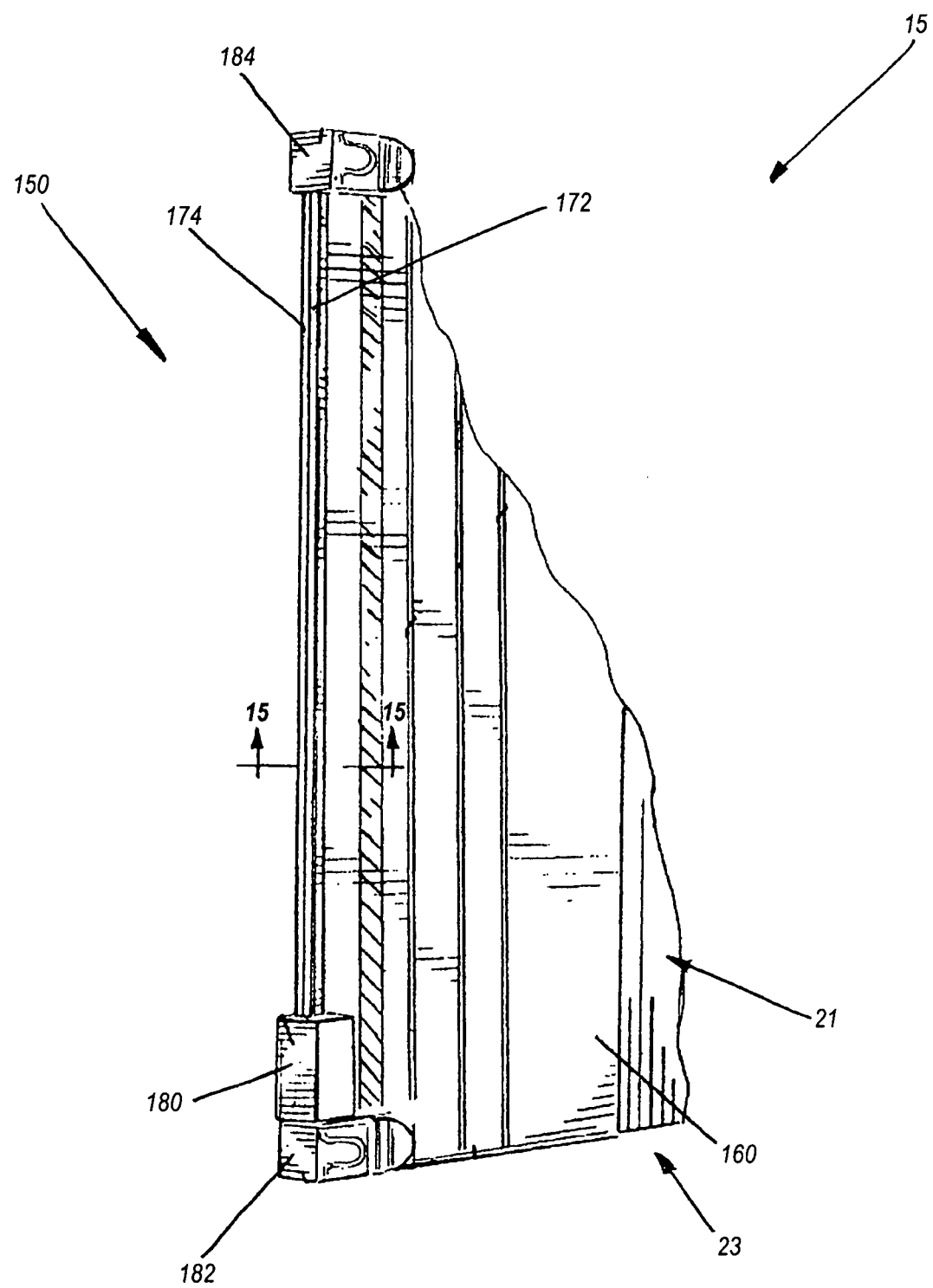
FIG. 14 illustrates a perspective view of a portion of an embodiment of a zipper closure at an end of an embodiment of a bag.

With reference to FIG. 14, in other embodiments, the top end 23 of the bag can comprise a zipper closure 150. In certain embodiments, the zipper closure 150 can be reclosable such that the closure can be selectively opened or closed repeatedly, as desired. In some embodiments, the zipper closure 150 comprises one or more connection portions 160, which can comprise a skirt, flaps, or extensions. The connection portions 160 can be connected to the top end 23 of the tube body 21 in any suitable manner, and in some embodiments, can form a substantially airtight, fluid-tight, and/or grease-impermeable seal therewith, as further discussed below.

In some embodiments, the zipper closure 150 comprises a first zipper track 172 and a second zipper track 174 that are configured to selectively engage each other and disengage from each other. In some embodiments, the zipper tracks 172, 174 can form a substantially airtight, fluid-tight, and/or grease-impermeable seal when engaged with each other. In further embodiments, the zipper closure comprises a sliding block 180 configured to transition the zipper tracks 172, 174 between the engaged and disengaged states. The block 180 can move between two stops 182, 184, which can serve to limit the translational movement of the block 180.

Figure 16:
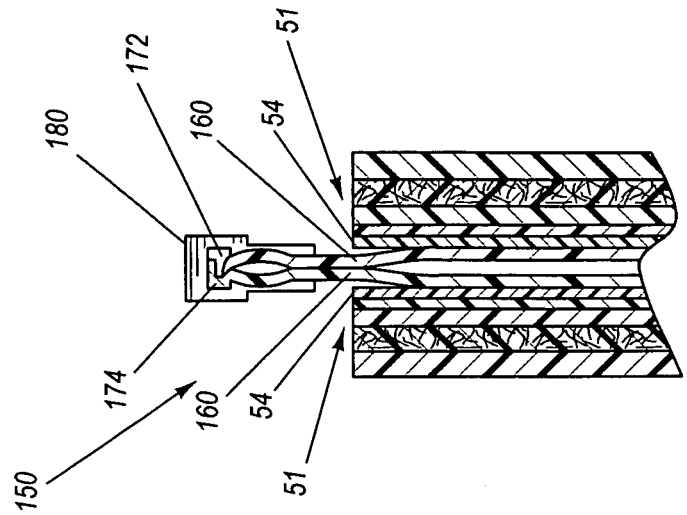
FIG. 16 illustrates a cross sectional view of another embodiment of a zipper closure.
Figure 15:
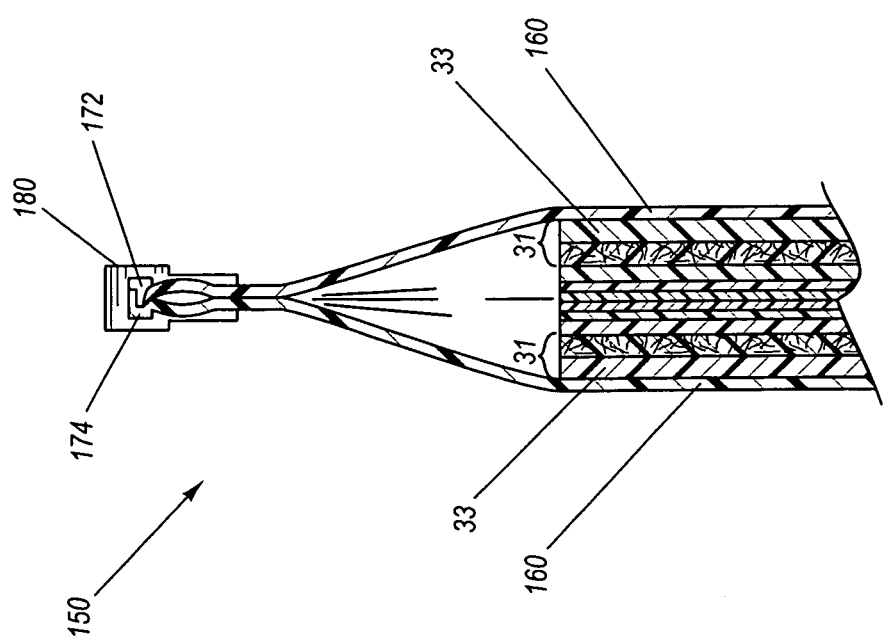
FIG. 15 illustrates a cross-sectional view of the zipper closure of FIG. 14 taken along the view line 15-15 in FIG. 14.

With reference to FIGS. 15 and 16, in some embodiments, the block 180 can compress the first and second zipper tracks 172, 174 into sealed contact with each other to transition the zipper tracks 172, 174 to the engaged state. The block 180 can cause the first and second zipper tracks 172, 174 to separate from each other to transition the zipper tracks 172, 174 to the disengaged state.

With reference to FIG. 15, in some embodiments, the connection portion 160 of the zipper closure 150 comprises a heat sealable material. In some embodiments, the connection portion 160 is placed in contact with an outer surface of a heat sealable portion of the outer ply 31 (e.g., the film 33) and is heat sealed thereto. With reference to FIG. 16, in other embodiments, the connection portion 160 is placed in contact with an inner surface of a heat sealable portion of the inner ply 51 (e.g., the film 54) and is heat sealed thereto. Any suitable heat sealing methods and materials may be used, such as those discussed herein.

With continued reference to FIG. 16, in still further embodiments that do not include the inner ply 51 (e.g., embodiments of the body materials 7 illustrated in FIGS. 3A, 3B, 3C, 4A, and 4B), the nonwoven layer 35 can be heat-sealable. Accordingly, in some embodiments, the connection portion 160 is placed in contact with an inner surface of a heat sealable portion of the nonwoven layer 35 and is heat sealed thereto. In such an arrangement, the inner ply 51 shown in FIG. 16 would be omitted.

In other embodiments, a heat-sealed and/or an adhesion seam can be used to close the top end 23 of the bag 15. FIGS. 17-20B illustrate certain embodiments of such closure seams. As discussed above, various embodiments of the bag 15 can be be closed at either the bottom end 25 or the top end 23 of the bag, filled, and then the other end can be closed in any suitable manner. Accordingly, for certain portions of the following discussion, it can be assumed that the bottom end 25 of the bag has been previously sealed and the top end 23 of the bag is subsequently sealed. Moreover, certain references to the top end 23 may also refer to the bottom end 25, as either end can be closed secondarily. The following discussion and examples are merely illustrative, and should not be construed as limiting.

Figure 17:
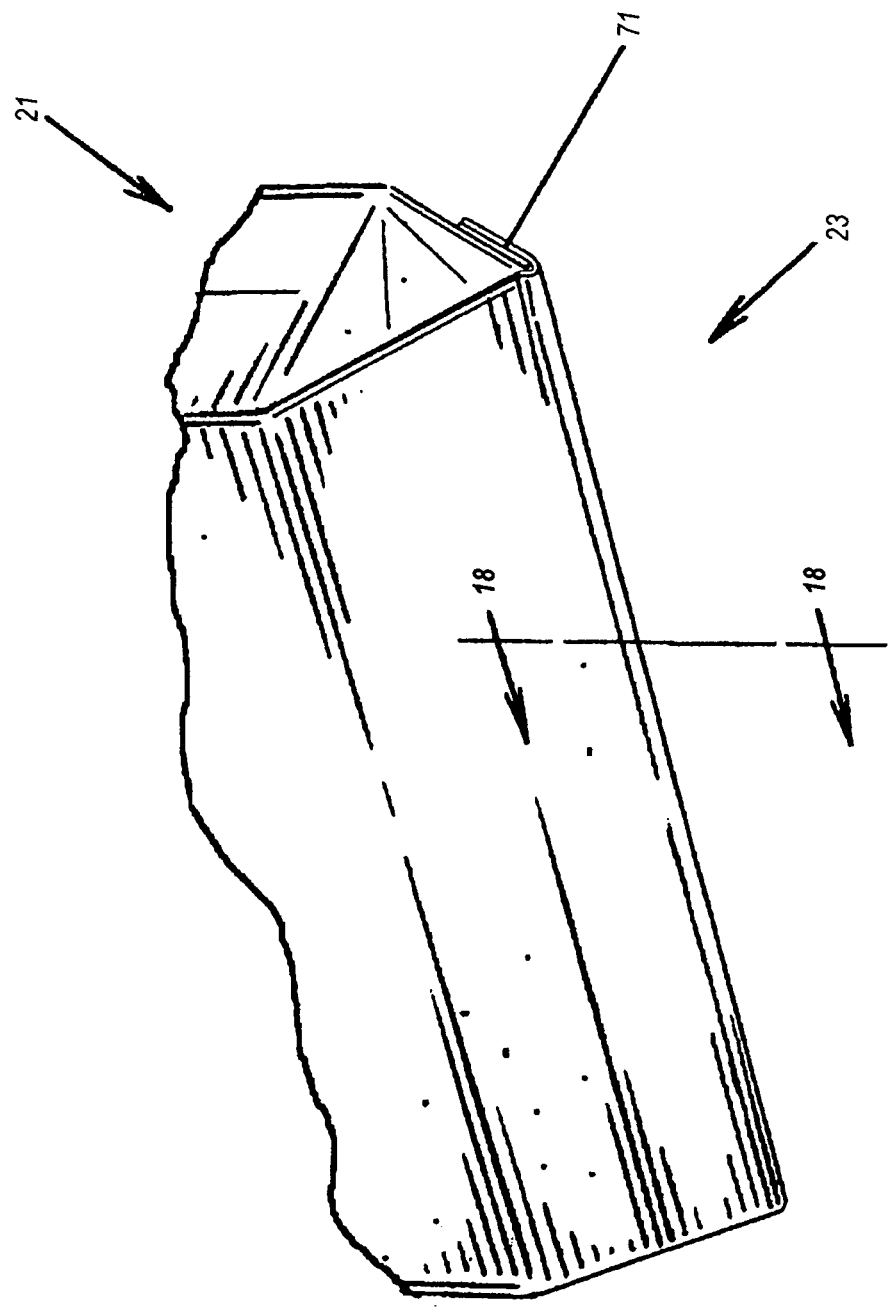
FIG. 17 illustrates a perspective view of an embodiment of a closed end of a bag.
Figure 18A:
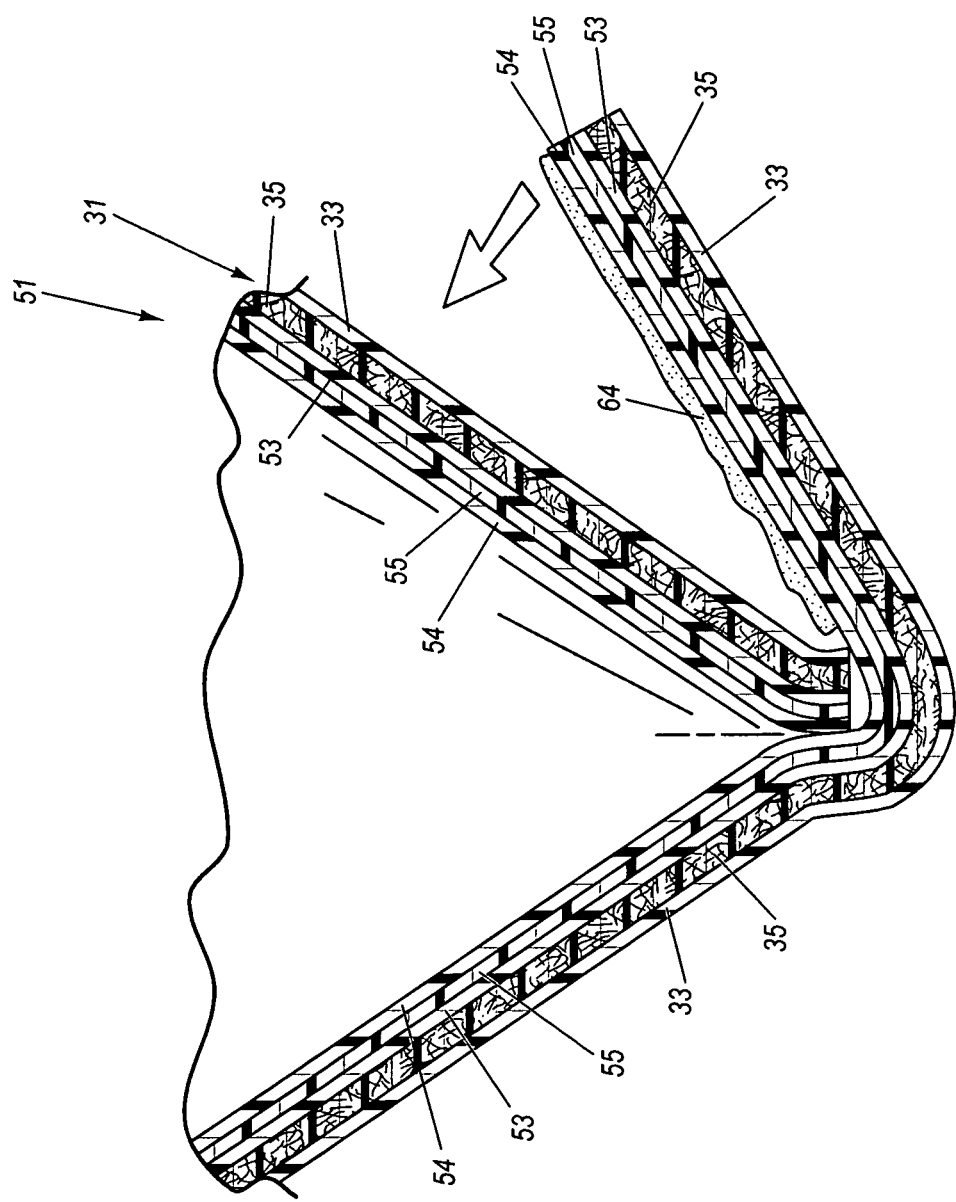
FIG. 18A illustrates a cross-sectional view of the bag of FIG. 17, during formation of the closed end, taken along the view line 18-18 in FIG. 17.
Figure 18B:
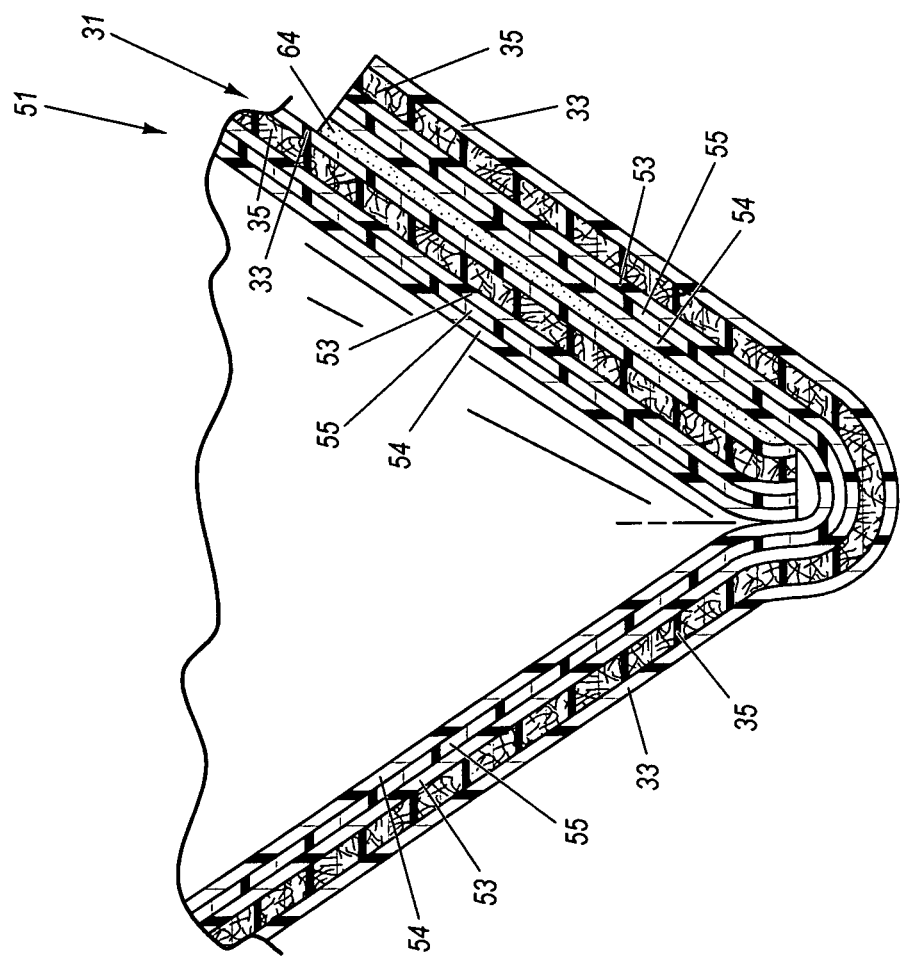
FIG. 18B illustrates a cross-sectional view of the bag of FIG. 18A, after formation of the closed end, taken along the view line 18-18 in FIG. 17.
Figure 18C:
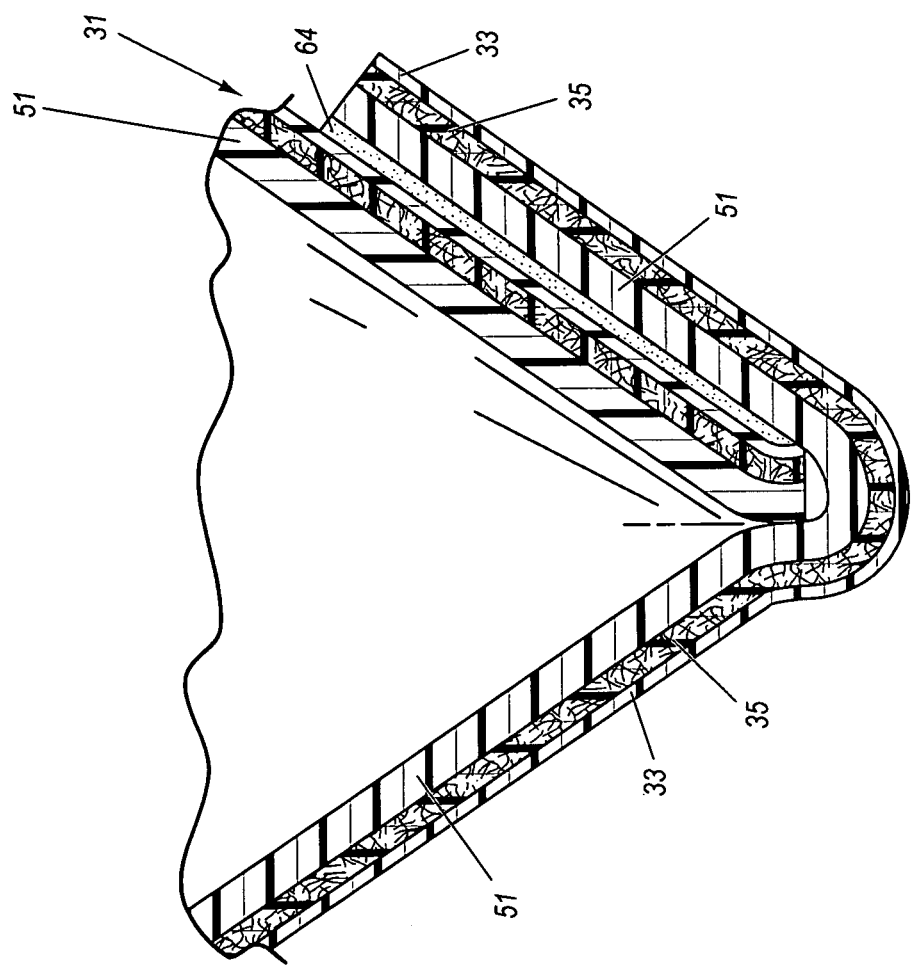
FIG. 18C illustrates a cross-sectional view such as that of FIG. 18A of another embodiment of a closed end of a bag.
Figure 18D:
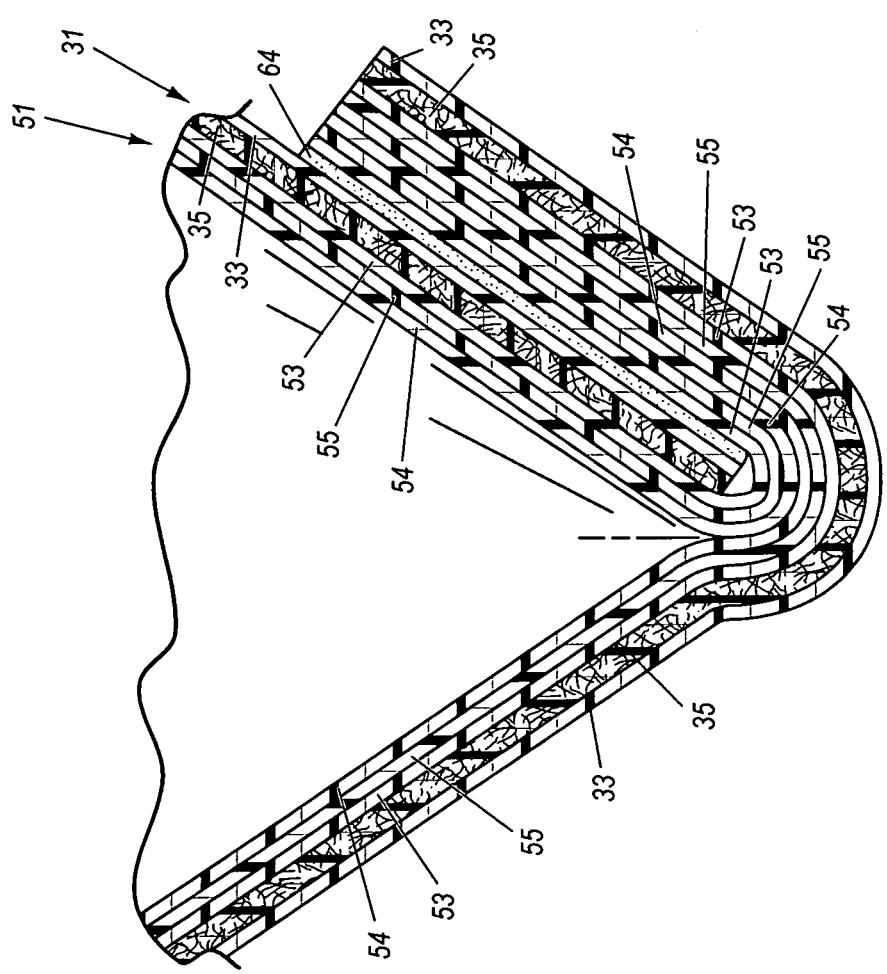
FIG. 18D illustrates a cross-sectional view such as that of FIG. 18A of another embodiment of a closed end of a bag.
Figure 18E:
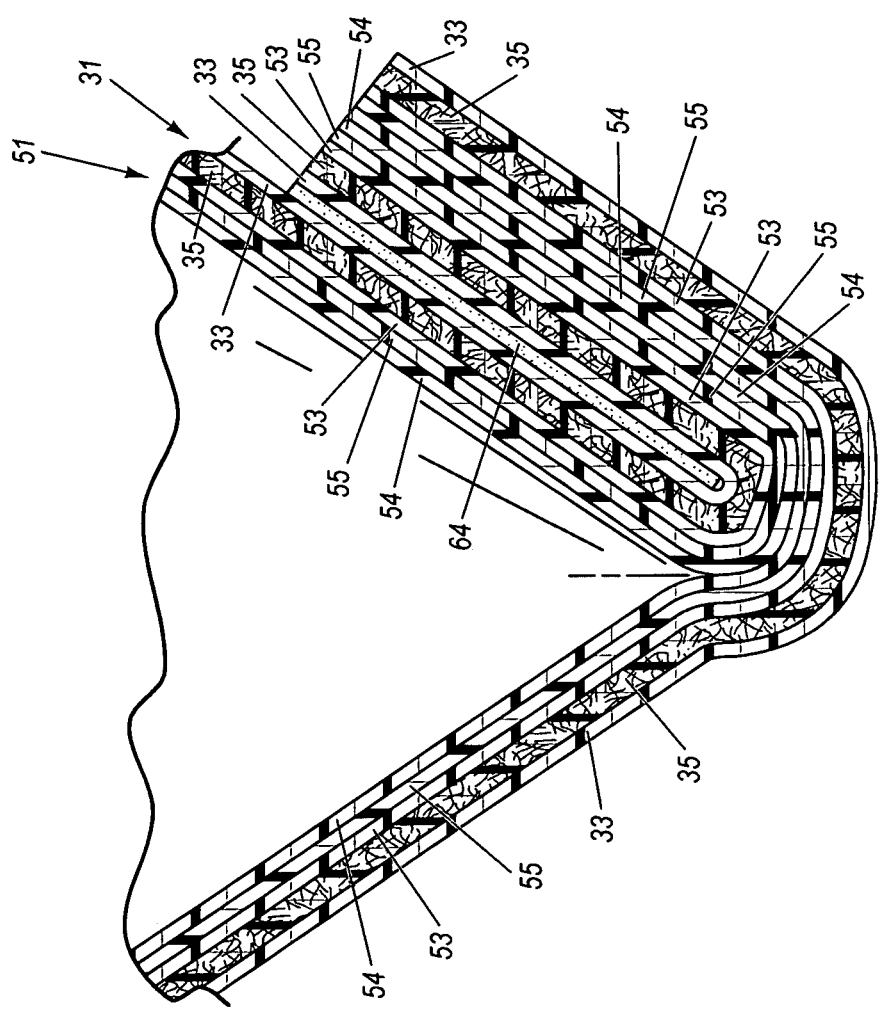
FIG. 18E illustrates a cross-sectional view such as that of FIG. 18A of another embodiment of a closed end of a bag.

With reference to FIGS. 17-18E, in some embodiments, a portion of at least one of the inner and outer plies 51, 31 of at least one of the opposing bag ends 23, 25 foldingly and adheringly overlying another portion of the one bag end 23 to define an overlapping seam extending along substantially an entire transverse extent of the one bag end 23 to thereby closingly seal the one bag end 23 so that a product, when positioned therein, is retained within inner confines of the bag 15 between the opposing pair of bag ends 23, 25. Embodiments can include the inner face of the inner ply 51 of at least one of the opposing bag ends 23 adheringly overlying the outer face of the outer ply 31 of the same bag end 23 to define an overlapping seam substantially extending along a transverse extent of the bag end 23. Embodiments can also include the outer face of the outer ply 31 of at least one of the opposing bag ends 23 adheringly overlying the same outer face of the same outer ply 51 of the same bag end 23 as part of the overlapping seam substantially extending along a transverse extent of the bag end 23.

Additionally, embodiments such as those shown in FIGS. 18A-18E, embodiments of a bag and/or bag closure can include an adhesive 64 including components of rosin ester and ethylene vinyl acetate adhering a portion of at least one of the inner and outer plies 51, 31 of at least one of the opposing bag ends 23 to another portion of the same bag end 23 to define an overlapping seam substantially extending along a transverse extent of at least one of the pair of bag ends 23. The hot melt adhesive 64 can be supplied, for example, as Product No. 70-4467 from NATIONAL STARCH AND CHEMICAL COMPANY, 10 Finderne Avenue, Bridgewater, N.J. 08807. In further embodiments, the adhesive 64 can include a component selected from the group consisting of styrene-isoprene-styrene copolymers, styrene-butadiene-styrene copolymers, ethylene ethyl acrylate copolymers, polyurethane reactive adhesives, tackifiers, waxes, paraffin, antioxidants, plasticizers, plant sterols, terpene resins, polyterpene resins, turpentines, hydrocarbon resins, resin acids, fatty acids, polymerized rosins, and polyamide adhesives.

Other embodiments of the bag 15, such as those illustrated for example in FIGS. 18A-18D, can include a tubular bag body having a pair of opposing bag ends 23, 25 and an inner face of an outer ply 31 abuttingly adhering to an outer face of an inner ply 51. The outer ply 31 can include a grease-resistant film, and the inner ply 51 can include a grease-resistant material. An end portion of at least one of the inner and outer plies 51, 31 of at least one of the opposing bag ends 23 can adheringly overlie another portion of the same bag end 23 with an adhesive 64, such as described above, so that the grease resistant film of the outer ply 31 contacts the adhesive 64 and the grease resistant material of the inner ply 51 contacts the adhesive 64 to thereby define an overlapping seam substantially extending along a transverse extent of the same bag end 23 to thereby closingly seal the bag end 23.

Other embodiments of the bag 15, such as that shown in FIG. 18E, can include a tubular bag body having a pair of opposing bag ends 23, 25 and an inner face of an outer ply 31 abuttingly adhering to an outer face of an inner ply 51. The outer ply 31 can include a polyester film, and the inner ply 51 can include a polymeric material. An end portion of at least one of the inner and outer plies 51, 31 of at least one of the opposing bag ends 23 can adheringly overlie another portion of the same bag end 23 with an adhesive 64, such as described above, so that the polyester material of the outer ply 31 contacts the adhesive 64 and the polymeric material of the inner ply 51 contacts the adhesive 64 to thereby define a bag closure to thereby define an overlapping seam substantially extending along a transverse extent of the same bag end 23 to thereby closingly seal the bag end 23.

Within the adhesives industry, hot melts, for example, can have good performance and usage benefits, as understood by those skilled in the art. Hot melt adhesives can be solvent-free adhesives that are characteristically solid at temperatures below 180 degrees F., are low viscosity fluids above 180 degrees F., and rapidly set upon cooling. Hot melt adhesives are used in a variety of manufacturing processes. There are a number of hot melt adhesives in use, with the most common being those used for hot melt pressure sensitive adhesive applications. For example, hot melt adhesives can include ethylene vinyl acetate (EVA) copolymers, which can be compatible with paraffin; styrene-isoprene-styrene (SIS) copolymers; styrene-butadiene-styrene (SBS) copolymers; ethylene ethyl acrylate copolymers (EEA); and polyurethane reactive (PUR).

Generally, these polymers may not exhibit the full range of performance characteristics that can be required for certain end products by themselves. For this reason, for example, a variety of tackifying resins, waxes, antioxidants, plasticizers, viscosity reducers, and other materials can be added to the adhesive formulation to enhance the polymer performance.

For example, the PUR adhesive is a 100 percent solid, one-component urethane prepolymer that behaves like a standard hot melt until it reacts with moisture to crosslink or chain extend, forming a new polyurethane polymer. By curing the polymer in this way, PURs have performance characteristics that can be more enhanced than those of standard hot melts. Unlike many of the other hot melts, which can require a slot die or roll coater, PURs can be applied to a substrate as a dot or a thin glue line, can set in seconds, and can be structurally rigid in minutes following a final set. These adhesives have been accepted in many manufacturing industries, for example, where they can be applied in small bond points to eliminate use of mechanical fasteners, such as staples, screws, rivets, clips, snaps, nails or stitching.

Furthermore, for example, certain groups of pine chemicals (with the exception of plant sterols, in many instances), can also be used by the adhesives and sealants industry. Pine chemicals are renewable, naturally occurring materials derived from the pine tree (genus *pinus*). The range of chemical classes obtained from pine trees includes numerous plant sterols, terpenes (or turpentine), resin acids (or rosin) and fatty acids. Rosin resins, including esters and polymerized rosins, are used as tackifiers to modify the properties of selected polymers to produce adhesives and sealants. Polyterpene resins are used to modify non-polar polymers for these same applications. Tall oil fatty acids can be dimerized to produce dimer fatty acids that, in turn, can be a major ingredient in thermoplastic polyamide adhesives.

For example, three major classes of tackifier resins for the adhesives industry can include terpene, hydrocarbon and rosin resins. Terpene resins (pine-based) and hydrocarbon resins (petrochemical-based) are both hydrocarbons; that is, they contain only carbon and hydrogen. Although they are somewhat similar in that respect, they impart somewhat different properties to the resultant adhesives. Terpene-based resins are more diverse than petrochemical hydrocarbons in that these resins can be readily modified with other chemicals (e.g., phenol) to produce an array of products. Notably, for example, rosin resins significantly differ from the previous two types in that they contain carboxylic acid and/or ester groups. These resins are generally more polar and narrower in molecular weight, for example, making them good tackifiers for a variety of end-use applications.

In some instances, hot-melt packaging adhesives can be developed to run faster than traditional adhesives, in some applications, and can perform on a range of substrates. Terpene phenolic resins, derivatives of alpha-pinene, can deliver enhanced adhesion qualities to difficult substrates such as recycled cardboard. They can offer better green strength, making them useful for high-speed packaging lines with short set times. Rosin esters are commonly used to increase adhesion and the temperature performance range of ethylene vinyl acetate (EVA) based adhesives. This combination of elements in a hot melt adhesive can be used as a closure (e.g., end, sides, or other overlap region) for a bag in applications, for example, of a polyester or grease-resistant material facing another polymeric or grease resistant material. Rosin esters can be compatible with a range of polymers, thus limiting formulating complexity.

Ethylene vinyl acetate (EVA), for example, can be produced by the random copolymerization of ethylene and vinyl acetate in predetermined ratio. The presence of VA reduces the crystallinity as the large acetoxy group distorts the chain structure. The stiffness of EVA varies with VA content. However, beyond about 60 percent VA, the stiffness rises sharply as pure vinyl acetate is a glass-like substance at room temperature. The practical limit for certain "mechanical" uses of EVA is about 20 percent VA content; however, for certain "adhesive" uses, higher levels of VA can be employed. High VA level copolymers are typically used in adhesive applications, while lower vinyl acetate containing copolymers, which can have greater tensile moduli and surface hardness, find greatest use in films, profile extrusions and injection molding. The higher percent VA resins have a good compatibility with other materials. Thus, EVA is widely used in blends and compounds. One main application, for example, is hot melt adhesives, where the EVA is blended with tackifier and paraffin wax.

As understood by those skilled in the art, the polarity of the VA molecule makes the copolymers receptive to high filler loadings and to combination with tackifiers and other adhesive components. The addition of the rosin ester to EVA can produce a compatible mixture. The increase in the VA amount decreases the crystallinity of EVA and the elastic and viscous modules, but increases the peel strength and the tack. The tackifier improves the adhesion and increases the "open time" of the formulation.

Figure 19:
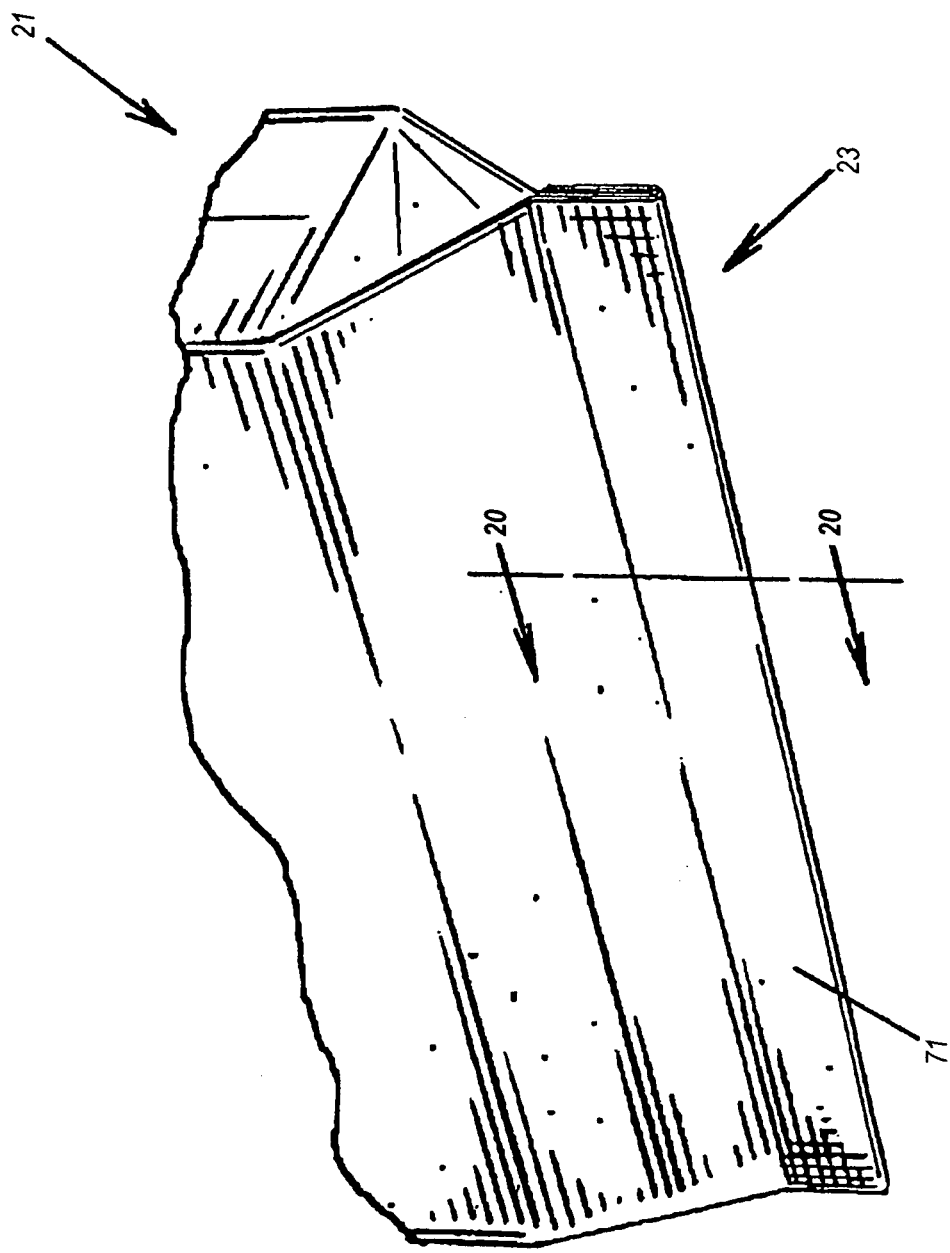
FIG. 19 illustrates a perspective view of another embodiment of a closed end of a bag.
Figure 20A:
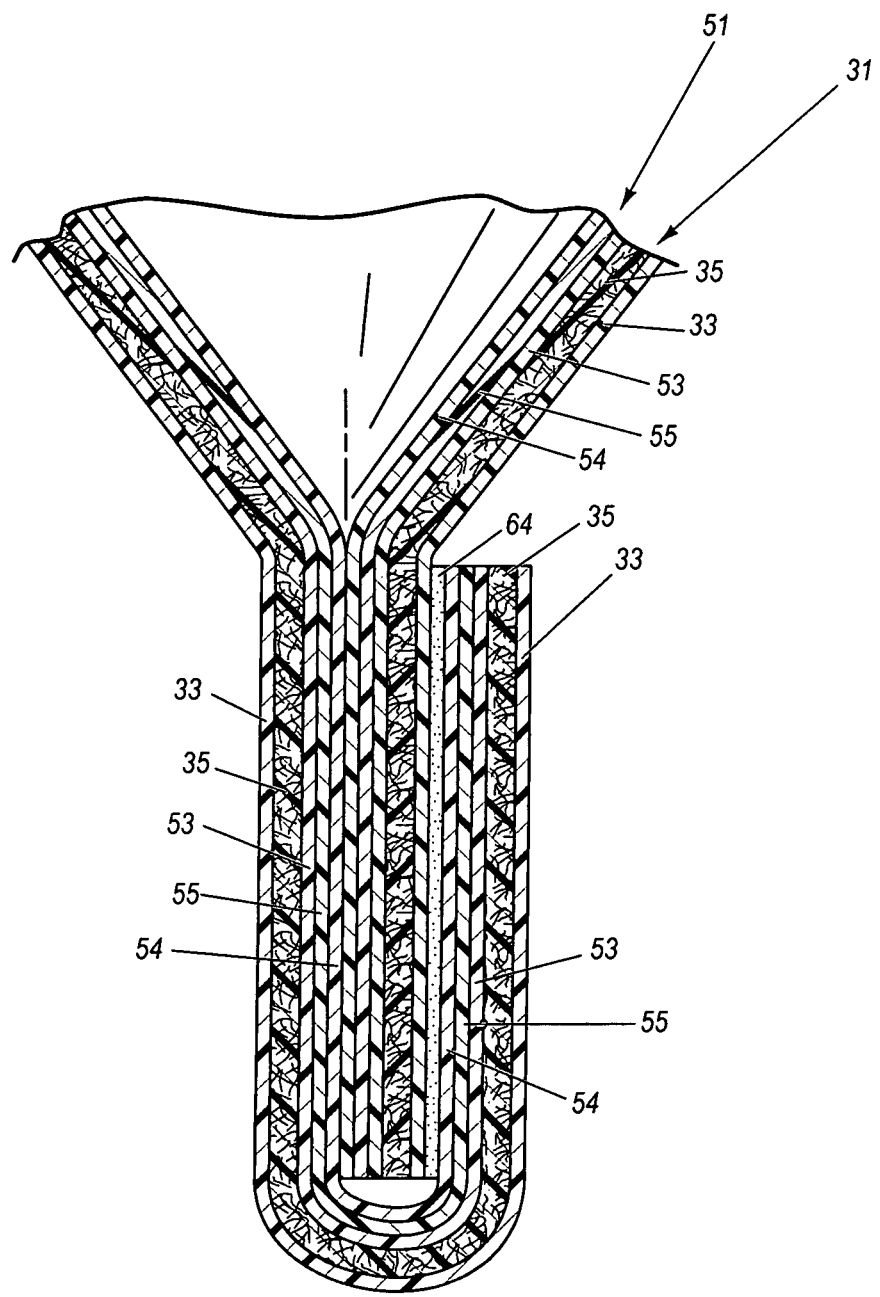
FIG. 20A illustrates a cross-sectional view of the closed end of the bag shown in FIG. 19 taken along the view line 20-20 in FIG. 19.
Figure 20B:
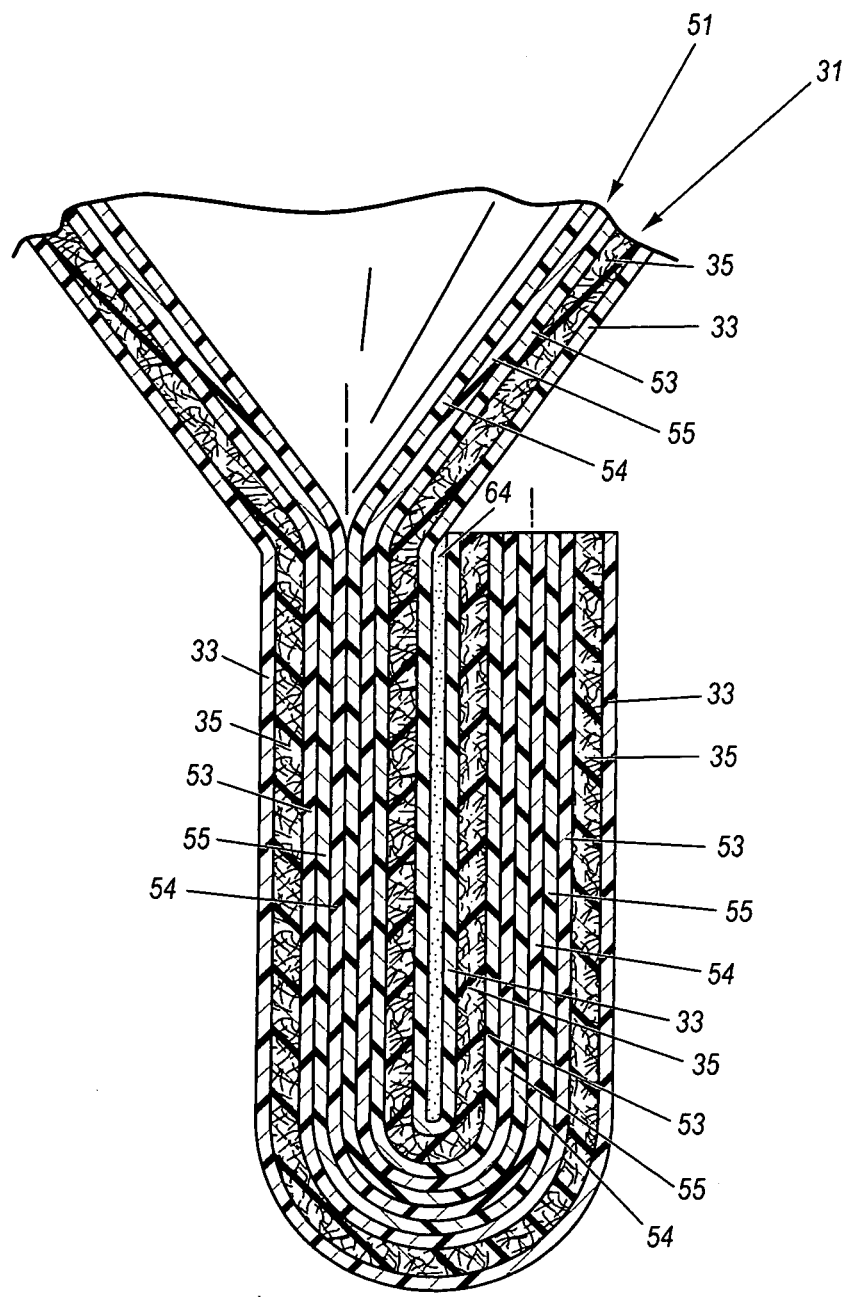
FIG. 20B illustrates a cross-sectional view such as that of FIG. 20A of another embodiment of a closed end of a bag.

In a further embodiment in which one or more bag ends or other bag closures are heat-sealed, a bag end 23 is adapted to be positioned so that opposingly facing first and second portions of the inner ply 51 are compressed between opposingly facing first and second portions of the outer ply 31 to define a compressed lip 71, as shown in FIGS. 19-20B. The compressed lip 71, for example, can have a first portion of the second heat-sealable film 54 of the inner ply 51 meltingly bonded with an opposingly facing second portion of the second heat-sealable film 54 of the inner ply 51 along a transverse extent of at least one of the pair of bag ends 23, 25 responsive to heat applied thereto. Application of the heat to the bag end 23 thereby advantageously closingly seals the bag end 23 so that a food element 17, when positioned therein, is retained within inner confines of the bag 15 defined by other unsealed portions of the second heat-sealable film 54 positioned between the opposing bag ends 23, 25. FIG. 8E shows an embodiment of a bag where the food element 17 is positioned inside the bag, illustrating the grease component G being prevented from penetrating the inner and outer plies 51, 31 of the food bag 15.

Each of the materials used to construct the bag 15 can have a different range of melting temperatures. For example, in some embodiments, a polyester film 33 of the outer ply 31 has a melting point temperature greater than a heat-sealable film 54 of the inner ply 51. In some embodiments, the polyester film 33 of the outer ply 31 has a melting temperature in the range of about 300 degrees Fahrenheit to about 475 degrees Fahrenheit, and in further embodiments, greater than about 425 degrees Fahrenheit. In some embodiments, the heat-sealable film 54 of the inner ply 51 has a melting point temperature in the range of about 220 degrees Fahrenheit to about 300 degrees Fahrenheit, and in further embodiments, greater than about 240 degrees Fahrenheit. The polyethylene heat-sealable film 54 of the inner ply 51 can have a lower melting temperature and therefore melts easier and at lower temperatures than the grease-resistant polyester film 33 of the outer ply 31. A sufficiently low melting point temperature for the heat-sealable film 54 of the inner ply 51 advantageously allows for the melting and bonding of the second heat-sealable film 54 to closingly seal the bag end 23, 25.

For example, in some embodiments, a heat-sealing bag machine performs the function of forming and shaping the multi-layered structure into a bag 15 by accordingly compressing and melting the bag ends 23, 25 to closingly seal the bag ends 23, 25. The heat-sealing bag machine has an extended heater belt and/or heated jaws that carry out the heat-sealing procedure. The heat can alternatively be applied, for example, by heated rollers, a heated wire/wires, or a heated air zone that adequately melts the heat-sealable film 54, as understood by those skilled in the art. The extended heater belt and/or heated jaws can mass-produce the heat-sealed products through a continuous high-speed operation, which manufactures a quality product in massive quantities to be delivered to customers. In some applications, for example, the bag manufacturer typically heat-seals one end of each bag and delivers the bag to a customer, and the customer fills the bag with the proper elements and ultimately heat-seals the other end of the bag. The heat-sealing process can form bags with a lip as herein described, or can alternatively form bags that have a flattened top end and flattened bottom end to thereby provide the capability of stacking multiple bags neatly on top of one another.

To describe heat-sealing processes for certain embodiments more specifically, the polyethylene portion of the heat-sealable film 54 of the inner ply 51 at the bag ends 23, 25 can be heated to a melting point temperature of at least about 220 degrees Fahrenheit to melt the heat-sealable polyethylene film of the bag ends 23, 25. Alternatively, the temperature could be raised in excess of about 300 degrees Fahrenheit, in one embodiment for example, to melt not only portions of the polyethylene heat-sealable films 54 together but also to melt portions of the polyester films 33 together as well, thus advantageously forming an even tighter closed seal at the bag ends 23, 25. In one embodiment, for example, the manufacturer utilizing the heat-sealing bag machine will seal only one end 23, 25 portion of the bag 15, thereby leaving another end 23, 25 portion of the bag 15 open to eventually fill the bag 15 with food or other elements or product 17. The distributor of the goods, for example, then fills the bag 15 with the product 17, and thereafter seals the other end 23, 25 portion of the bag 15 after the bag 15 is full.

Methods of assembling, positioning, using, and constructing embodiments of a multi-layered bag 15 are also disclosed herein. The following discussion includes specific references to certain of such embodiments. The discussion is for illustrative purposes only, and should not be construed as limiting. Moreover, any suitable combination of the following disclosure with any portion of the foregoing disclosure is contemplated.

In certain embodiments, before any of the layers of a tube-forming material are bonded or adhered together, a method of constructing a bag 15 can include printing printed indicia 29 on the inner face of the grease-resistant film 33 of the outer ply 31 to advantageously enhance visual appearance of the bag 15.

In certain embodiments, a method of constructing a bag 15 can include adhering an inner face of a grease-resistant polyester film 33 with an outer face of a nonwoven layer 35 to create an outer ply 31. The method can also include adhering an inner face of a first film 53 to an outer face of a grease-resistant material 55 and adhering an inner face of the grease-resistant material 55 to an outer face of a second film 54 to create a multi-layer inner ply 51. The method can also include adhering an inner face of the outer ply 31 to an outer face of the inner ply 51 to create a laminate with a pair of opposing ends 23, 25. The method can also include overlying a portion of an inner face of the inner ply 51 located at one lateral side of the laminate onto a portion of an outer face of the outer ply 31 located at another lateral side of the laminate to define an overlapping seam extending along a longitudinal extent of a tubular portion of the bag. The method can also include adheringly overlying an end portion of at least one of the inner and outer plies 51, 31 of at least one of the opposing bag ends 23 onto another portion of the same bag end 23 with an adhesive 64 including components of rosin ester and ethylene vinyl acetate to define an overlapping seam substantially extending along a transverse extent of the same bag end 23 to thereby closingly seal the bag end 23.

In some embodiments, an inner face of the inner ply 51 of at least one of the opposing bag ends 23 is adhered to an outer face of the outer ply 31 of the same bag end 23 to define an overlapping seam substantially extending along a transverse extent of the bag end 23. The method can further include closingly sealing the overlapping seam responsive to the adhering to thereby prevent grease from penetrating from within the bag 15 to outside the bag 15 and prevent grease from penetrating from outside the bag 15 to within the bag 15.

The method can also include adhering an outer face of the outer ply 31 of at least one of the opposing bag ends 23 against the same outer face of the same outer ply 31 of the same bag end 23 to define an overlapping seam substantially extending along a transverse extent of the bag end 23. The method can further include closingly sealing the overlapping seam responsive to the adhering to thereby prevent grease from penetrating from within the bag 15 to outside the bag 15 and prevent grease from penetrating from outside the bag 15 to within the bag 15.

Certain embodiments of bags and methods herein disclosed can have benefits and advantages. The combined use of polymeric structures and nonwoven material, for example, can combine the advantages of the thickness, puncture-resistance, durability, and/or bending stiffness of certain nonwoven materials with the puncture-resistant, heat-sealable, grease-resistant, and/or impermeability properties of polyester, including in some embodiments the heat-sealable characteristics of films such as polyethylene. Furthermore, the grease-resistant properties of the inner ply 51 can offer enhanced grease-resistance in addition to the grease-resistance properties of the outer ply 31. Embodiments of a bag can provide increased barrier protections from grease, endurance, strength, physical integrity, and heat-sealable characteristics not offered with other bags. The bag 15 can advantageously prevent problems customarily associated with greasy products such as pet food, for example, and eliminate the absorption and penetrable effect of the grease component included in such foods as pet food. Various bags 15 are often used in other settings where greasy elements are contained within the bags 15, and embodiments of the bag advantageously contribute to solving such problematic concerns attributable to the grease. Other applications of the bag 15 may include dry foods, beverages, feed, soil, lawn and garden, and building materials. Furthermore, certain embodiments can offer enhanced strength to allow the bag to carry relatively large loads with relative ease. For example, in various embodiments, large-format bags 15 can be configured for use with greater than about 15 kilograms, greater than about 20 kilograms, greater than about 25 kilograms, or greater than about 30 kilograms of product (e.g., pet food).

In some embodiments, materials used in constructing a bag can be environmentally friendly. For example, in some embodiments, a bag 15 can be fully recyclable. Further, in some embodiments, a bag 15 can advantageously be manufactured on existing equipment, such that investment in new and expensive bag manufacturing equipment is unnecessary.

As discussed above, a variety of bag styles are possible. For example, in various embodiments, the bag 15 can comprise gusseted pinch-bottom bag configurations, non-gusseted pinch-bottom bag configurations, other pinch-bottom bag configurations, various block-bottom configurations, and quad-style configurations, among others.

FIG. 21 depicts Table 2, which compares various properties of non-limiting examples of various nonwoven materials that are compatible with certain embodiments of a bag 15. For example, the materials can be used in embodiments of the nonwoven layer 35, depending on the desired qualities thereof.

As shown in the first column, nonwoven materials are available from a variety of suppliers, such as DuPont of Wilmington, Del.; Fiberweb of Simpsonville, S.C.; Arjobex of Issy les Moulineaux, France (supplier of Polyart® paper); and Ahlstrom of Helsinki, Finland. In Table 2, product names and/or supply numbers are listed with the suppliers of the products. The abbreviation gsm represents grams per square meter, the abbreviation PP represents polypropelene fibers, the abbreviation PET represents polyethylene terephthalate fibers, and the abbreviation PE/PET represents polyethylene fibers sheathed in polyethylene terephthalate.

As can be seen in Table 2, in various embodiments, nonwoven materials used in the body material 7 can have a density of from about 10 grams per square meter to about 200 grams per square meter, from about 40 grams per square meter to about 150 grams per square meter, from about 40 grams per square meter to about 100 grams per square meter, or from about 50 to about 90 grams per square meter. In other embodiments, the nonwoven material can have a measurement of no more than about 40 grams per square meter, no more than about 50 grams per square meter, no more than about 60 grams per square meter, no more than about 70 grams per square meter, no more than about 80 grams per square meter, no more than about 85 grams per square meter, no more than about 90 grams per square meter, no more than about 100 grams per square meter, or no more than about 140 grams per square meter.

In the second through sixth columns of Table 2, the listed tests are known in the art of plastic films. It is noted that the abbreviation MD represents machine direction and the abbreviation CD represents cross direction, as these terms are understood in the art.

FIG. 22 depicts Table 3, which compares various properties of an "average" woven polypropylene material (comprising a 10-thread-by-10-thread-per-square-inch weave of 850 denier threads) with non-limiting examples of various nonwoven materials and films that are compatible with certain embodiments of a bag 15. As shown in the illustrative embodiments, certain nonwoven materials can be obtained from the suppliers Fiberweb, DuPont, and Ahlstrom. As previously discussed, the nonwoven materials can be combined with one or more outer films (e.g., film 33) and/or one or more inner films (e.g., films 53, 54, and/or core layer 55).

The descriptions of the multi-layer materials are sufficient for those of skill in the art to understand the construction of the material. For example, as shown in row 2, in one embodiment, Reemay® spunbond polyester is thermally laminated to a film of BOPET having a thickness of about 12 microns. As shown in row 3, in another embodiment, Typar® spunbond polypropylene is thermally laminated to a film of polypropylene having a thickness of about 18 microns.

In rows 4, 5, and 12 through 15, the listed materials are extrusion laminated to each other, and in rows 12 through 15 in a particular, a white opaque extrudate (referred to as "white poly") is used. In rows 6 through 9, the listed materials are joined to each other via an adhesive. In particular, in row 6, an extrudate blend is used as the adhesive, and in rows 7-9, an adhesive film ("AF1" or "AF2") is used. In rows 10 and 11, the listed materials are joined via a solventless adhesive ("adh").

In rows 4 through 8 and 10, the material ACT1 is a nonwoven material having fibers that comprise a polyester core and a polyethylene sheath, and the material has a density of about 85 grams per square meter. In rows 9 and 11, the material ACT2 is a nonwoven material having fibers that comprise a polyester core and a co-polyester sheath, and the material has a density of about 85 grams per square meter. In rows 12 through 15, the abbreviation "2.5 oz NW" represents that a nonwoven material has a density of about 2.5 ounces per square yard (or about 85 grams per square meter).

In the second through sixth columns of Table 3, the listed tests are known in the art of plastic films. It is noted that the abbreviation MD represents machine direction and the abbreviation CD represents cross direction, as these terms are understood in the art.

Table 3 illustrates that certain embodiments of a body material 7 that includes a nonwoven material can exhibit properties similar to those of a typical woven polypropylene bag. The use of such nonwoven materials can be achieved in a cost-effective manner, and can provide a suitable and, in many instances, advantageous alternative to woven polypropylene.

Various modifications, changes, and variations apparent to those of skill in the art may be made in the arrangement, operation, and details of the apparatus and methods detailed in the disclosure without departing from the spirit and scope of the disclosure. Thus, it is to be understood that the embodiments described above have been presented by way of example, and not limitation. Any suitable combination of the features described above is contemplated. Moreover, each embodiment recited in the claims that follow is incorporated herein as a separate embodiment.

The invention claimed is:

1. A bag comprising:
 a body material that defines a front wall, a back wall, a first side wall, and a second side wall, the body material comprising a first layer, a second layer, and a third layer, wherein an inwardly facing surface of the first layer defines an innermost face of the body material that is configured to directly contact the contents of the bag when the bag is in a filled state and an outwardly facing surface of the first layer is laminated to an inwardly facing surface of the second layer, wherein the first layer consists of a single-layer, grease-impermeable nylon or polypropylene film that is configured to prevent grease from passing from the contents of the bag to the second layer, wherein the second layer comprises a web of nonwoven material, and wherein the third layer comprises a polyolefin film laminated to an outwardly facing surface of the nonwoven material; and
 a closure at a first end of the bag, wherein the closure comprises a seal configured to prevent the contents of the bag from exiting the bag via the first end when the bag is in the filled state.

2. The bag of claim 1, wherein the web of nonwoven material comprises polymeric fibers.

3. The bag of claim 2, wherein the polymeric fibers comprise one or more of polypropylene fibers, polyethylene fibers, and polyester fibers sheathed in one or more of polyethylene, a co-polyester, and/or a copolymer of polyethylene.

4. The bag of claim 2, wherein the web of nonwoven material further comprises cellulosic fibers.

5. The bag of claim 2, wherein the web of nonwoven material is within a range of between about 10 and about 200 grams per square meter.

6. The bag of claim 1, wherein the web of nonwoven material comprises cellulosic fibers.

7. The bag of claim 1, wherein the web of nonwoven material is within a range of between about 10 and about 200 grams per square meter.

8. The bag of claim 1, wherein the third layer comprises printing.

9. The bag of claim 1, wherein the third layer is configured to prevent gases from entering the bag.

10. The bag of claim 1, wherein the bag further comprises a zipper closure that is heat sealed to the first layer at a second end of the bag.

11. The bag of claim 1, wherein the third layer comprises a heat-sealable material, and wherein the bag further comprises a zipper closure that is heat sealed to the third layer at a second end of the bag.

12. The bag of claim 1, wherein the closure at the first end of the bag comprises one of a sewn seam and a heat-sealed seam.

13. The bag of claim 1, wherein an edge of the body material overlaps a portion of the third layer to form a seam, and wherein the seam extends between the first end of the bag and a second end of the bag that is opposite the first end of the bag.

14. The bag of claim 1, wherein the third layer is treated with a coating on the outer face of the film.

15. The bag of claim 14, wherein the coating is oil, grease, and water resistant.

16. The bag of claim 1, wherein a second end of the bag comprises a portion of the front wall and a portion of the back wall, wherein the portion of the front wall extends beyond an end of the back wall such that the portion of the front wall may be folded to adheringly overlie the portion of the back wall to define an overlapping seam extending along substantially an entire transverse extent of the bag to closingly seal the second end of the bag.

17. The bag of claim 16, further comprising a hot melt adhesive, wherein the hot melt adhesive is configured to be positioned between the portion of the front wall that may be folded and the portion of the back wall to adhere the portions of the front and back wall to each other.

18. The bag of claim 1, wherein the single-layer, grease-impermeable nylon or polypropylene film is further configured to prevent mineral oils from passing from the contents of the bag to the second layer.

19. The bag of claim 1, wherein the single-layer, grease-impermeable nylon or polypropylene film is further configured to prevent solvents from passing from the contents of the bag to the second layer.

20. The bag of claim 1, wherein the single-layer, grease-impermeable nylon or polypropylene film is further configured to prevent acids from passing from the contents of the bag to the second layer.

21. A bag comprising:
a body material that defines a front wall, a back wall, a first side wall, and a second side wall, the body material comprising an outer layer and an inner layer, wherein the outer layer comprises a web of nonwoven material, and wherein the inner layer is laminated to an inwardly facing surface of the nonwoven material, the inner layer consisting of a single layer, grease-impermeable nylon or polypropylene film, wherein an inwardly facing surface of the film defines an innermost face of the body material that is configured to directly contact the contents of the bag when the bag is in a filled state, and wherein the film is configured to act as a barrier to grease; and
a closure at a first end of the bag, wherein the closure comprises a seal configured to prevent the contents of the bag from exiting the bag via the first end when the bag is in the filled state.

22. The bag of claim 21, wherein the web of nonwoven material is within a range of between about 10 and about 200 grams per square meter.

23. The bag of claim 21, wherein the bag further comprises a zipper closure that is heat sealed to the inner layer at a second end of the bag.

24. The bag of claim 21, further comprising a polyolefin film laminated to an outwardly facing surface of the web of nonwoven material.

25. The bag of claim 24, further comprising a zipper closure heat sealed to the polyolefin film that is laminated to the outwardly facing surface of the web of nonwoven material.

26. The bag of claim 24, wherein the polyolefin film that is laminated to an outwardly facing surface of the web of nonwoven material is printed.

27. The bag of claim 21, wherein a second end of the bag comprises a portion of the front wall and a portion of the back wall, wherein the portion of the front wall extends beyond an end of the back wall such that the portion of the front wall may be folded to adheringly overlie the portion of the back wall to define an overlapping seam extending along substantially an entire transverse extent of the bag to closingly seal the second end of the bag.

28. The bag of claim 27, further comprising a hot melt adhesive, wherein the hot melt adhesive is configured to be positioned between the portion of the front wall that may be folded and the portion of the back wall to adhere the portions of the front and back wall to each other.

29. A method of forming a bag, the method comprising:
providing a web of nonwoven material;
joining a grease-impermeable polyolefin film to the web of nonwoven material to form a body material, wherein the polyolefin film consists of a single-layer of nylon or polypropylene;
shaping the body material into a body having a front wall and a back wall such that the polyolefin film is oriented to be on the inwardly facing surface of the nonwoven material, wherein an inwardly facing surface of the polyolefin film defines an innermost face of the body material so that the polyolefin film provides a barrier to the passage of grease between an interior of the bag and the nonwoven material; and
joining an end of the front wall with an end of the back wall to form a closure.

30. The method of claim 29, wherein the web of nonwoven material is within a range of between about 10 and about 200 grams per square meter.

31. The method of claim 29, wherein the web of nonwoven material comprises polymer fibers.

32. The method of claim 29, wherein a second polyolefin film is joined to the web of nonwoven material on a side opposite the first polyolefin film.

* * * * *